US011454463B2

(12) United States Patent
Sangli et al.

(10) Patent No.: US 11,454,463 B2
(45) Date of Patent: Sep. 27, 2022

(54) FLUID EDUCTORS, AND SYSTEMS AND METHODS OF ENTRAINING FLUID USING FLUID EDUCTORS

(71) Applicants: General Electric Company, Schenectady, NY (US); General Electric Company Polska Sp. z o.o., Warsaw (PL)

(72) Inventors: Pradeep Hemant Sangli, Bangalore (IN); Vinod S. Chaudhari, Bangalore (IN); Santosh Kumar Potnuru, Bangalore (IN); Jeffrey Douglas Rambo, Mason, OH (US); Michal Starzynski, Warsaw (PL)

(73) Assignees: General Electric Company, Schenectady, NY (US); GENERAL ELECTRIC COMPANY POLSKA SP. Z O.O., Warsaw (PL)

( * ) Notice: Subject to any disclaimer, the term of this patent is extended or adjusted under 35 U.S.C. 154(b) by 435 days.

(21) Appl. No.: 16/447,192

(22) Filed: Jun. 20, 2019

(65) Prior Publication Data

US 2019/0390925 A1 Dec. 26, 2019

(30) Foreign Application Priority Data

Jun. 22, 2018 (PL) .......................................... 426033

(51) Int. Cl.
*F28F 13/12* (2006.01)
*F28F 13/06* (2006.01)
*B01F 25/312* (2022.01)

(52) U.S. Cl.
CPC ........ *F28F 13/12* (2013.01); *B01F 25/31243* (2022.01); *F28F 13/06* (2013.01); *F28F 2250/08* (2013.01)

(58) Field of Classification Search
CPC ........................... B01F 25/31243; B01F 5/043
(Continued)

(56) References Cited

U.S. PATENT DOCUMENTS 2,052,869 A   9/1936   Coanda
2,172,522 A   9/1939   Sline
(Continued)

FOREIGN PATENT DOCUMENTS

AT         196366 B   *   3/1958
AU       199733196 B2      2/1998
(Continued)

OTHER PUBLICATIONS

Machine translation of AT 196366, accessed via worldwide.espacenet.com on Jan. 25, 2022.*

(Continued)

*Primary Examiner* — Marc C Howell
(74) *Attorney, Agent, or Firm* — Dority & Manning, P.A.

(57) ABSTRACT

The present disclosure provides fluid eductors, systems that utilize fluid eductors, and methods of entraining a suction fluid flow using a fluid eductor. Exemplary fluid eductors include a concentric eductor space or a plurality of annular eductor spaces. Exemplary methods include ejecting a volume of motive fluid out of a concentric eductor space of a fluid eductor, accelerating a peripheral region of the suction fluid flow with the motive fluid ejecting out of the first annular eductor space, and accelerating a core region of the suction fluid flow with the motive fluid ejecting out of the second annular eductor space.

32 Claims, 17 Drawing Sheets

(58) Field of Classification Search
USPC ...................................................... 366/163.2
See application file for complete search history.

(56) References Cited

U.S. PATENT DOCUMENTS

| | | | |
|---|---|---|---|
| 3,047,208 | A | 7/1962 | Coanda |
| 3,337,121 | A | 8/1967 | Coanda |
| 3,815,487 | A | 6/1974 | Teodorescu et al. |
| 3,885,891 | A | 5/1975 | Throndson |
| 3,892,361 | A | 7/1975 | Mocarski |
| 4,037,991 | A | 7/1977 | Taylor |
| 4,192,461 | A | 3/1980 | Arborg |
| 4,395,202 | A | 7/1983 | Tell |
| 4,666,368 | A | 5/1987 | Hook, Jr. et al. |
| 5,228,839 | A | 7/1993 | Peterson et al. |
| 5,287,694 | A | 2/1994 | Davis et al. |
| 5,584,668 | A | 12/1996 | Volkmann |
| 6,357,374 | B1 | 3/2002 | Moore et al. |
| 6,582,199 | B1 | 6/2003 | Volkmann |
| 6,701,715 | B2 | 3/2004 | Anderson et al. |
| 6,896,475 | B2 | 5/2005 | Graziosi et al. |
| 8,083,895 | B2 | 12/2011 | Alev et al. |
| 8,142,169 | B2 | 3/2012 | Whaling et al. |
| 8,157,503 | B2 | 4/2012 | Junod |
| 8,454,322 | B2 | 6/2013 | Gammack et al. |
| 8,721,271 | B2 | 5/2014 | Wang et al. |
| 9,085,996 | B2 | 7/2015 | Ponnuraj et al. |
| 9,200,570 | B2 | 12/2015 | Alecu |
| 2004/0091350 | A1 | 5/2004 | Graziosi et al. |
| 2004/0094848 | A1 | 5/2004 | Lange |
| 2007/0089396 | A1 | 4/2007 | Anderson |
| 2007/0186631 | A1 | 8/2007 | Clark |
| 2008/0118371 | A1 | 5/2008 | Vasquez et al. |
| 2009/0060710 | A1 | 3/2009 | Gammack et al. |
| 2010/0034642 | A1 | 2/2010 | Evulet |
| 2010/0263382 | A1 | 10/2010 | Mancini et al. |
| 2011/0215172 | A1 | 9/2011 | Todorovic |
| 2013/0005237 | A1 | 1/2013 | Baten et al. |
| 2013/0068852 | A1* | 3/2013 | Wurz .................. F04F 5/04 239/8 |
| 2013/0318995 | A1 | 12/2013 | Sheoran et al. |
| 2013/0323089 | A1 | 12/2013 | Han |
| 2013/0327012 | A1 | 12/2013 | Mahabub et al. |
| 2014/0000720 | A1 | 1/2014 | Mortzheim et al. |
| 2014/0096502 | A1 | 4/2014 | Karlsson et al. |
| 2014/0190347 | A1 | 7/2014 | Wong et al. |
| 2015/0129040 | A1 | 5/2015 | Hartig et al. |
| 2015/0322861 | A1 | 11/2015 | Scipio et al. |
| 2015/0322866 | A1 | 11/2015 | Scipio et al. |
| 2015/0361887 | A1 | 12/2015 | Stearns et al. |
| 2016/0273401 | A1 | 9/2016 | Ekanayake et al. |
| 2016/0273408 | A1 | 9/2016 | Ekanayake et al. |
| 2016/0348585 | A1 | 12/2016 | Marini et al. |
| 2017/0057621 | A1 | 3/2017 | Evulet |
| 2017/0102010 | A1 | 4/2017 | Cheong |
| 2017/0342901 | A1 | 11/2017 | Scipio et al. |

FOREIGN PATENT DOCUMENTS

| | | | | |
|---|---|---|---|---|
| DE | 2134100 | A1 * | 3/1973 | ............ F23D 14/60 |
| GB | 598226 | A * | 2/1948 | ............... F04F 5/42 |
| GB | 598226 | A | 2/1948 | |
| GB | 2189843 | A | 11/1987 | |

OTHER PUBLICATIONS

Polish Search Report Corresponding to Application No. P426033 dated Jan. 28, 2019.

* cited by examiner

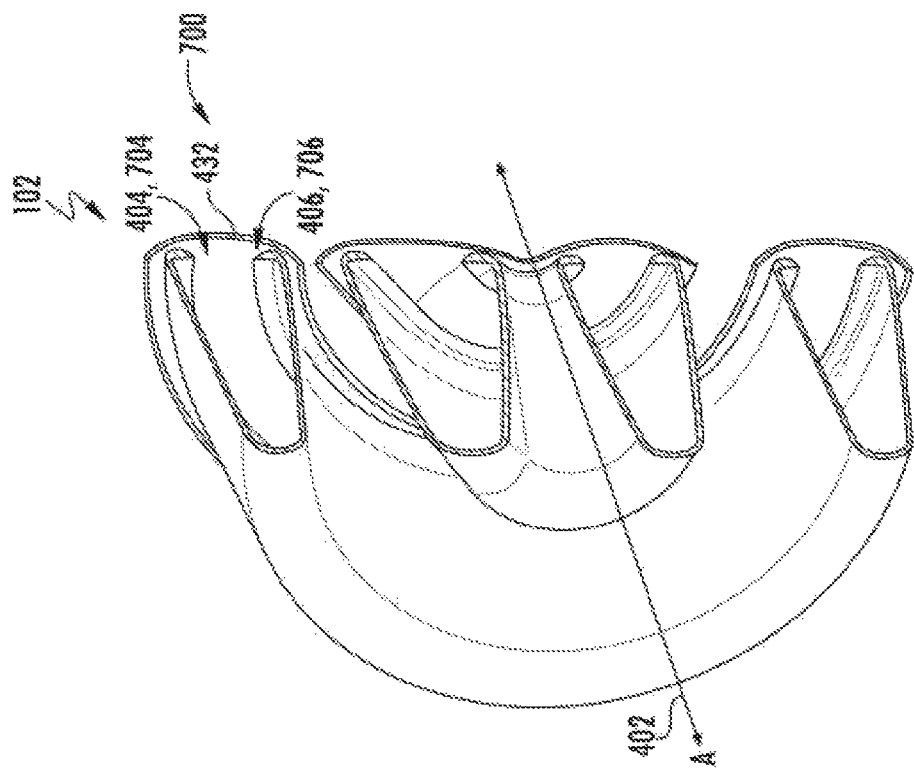
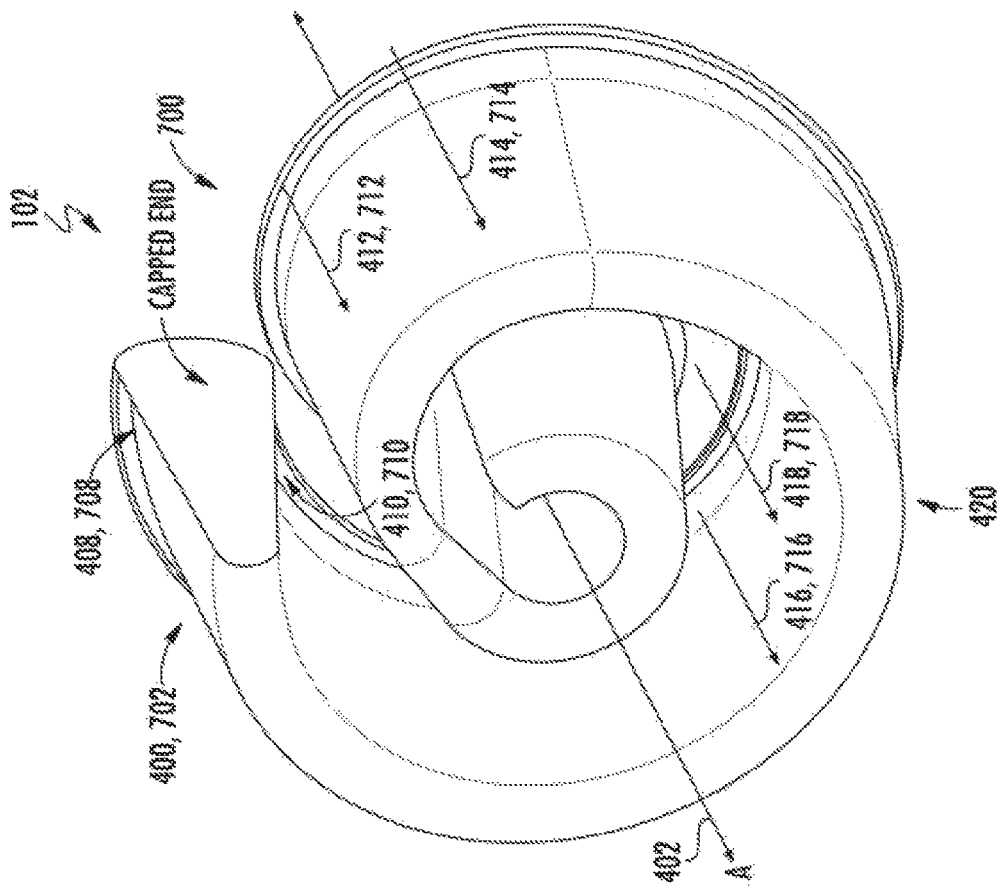
FIG. 7A
FIG. 7B

FLUID EDUCTORS, AND SYSTEMS AND METHODS OF ENTRAINING FLUID USING FLUID EDUCTORS

FIELD OF TECHNOLOGY

The present disclosure relates to fluid eductors, systems and methods, and more particularly to fluid eductors that have a concentric eductor space or a plurality of annular eductor spaces, and related systems and methods for entraining a suction fluid flow by ejecting a motive fluid from a concentric eductor space or a plurality of annular eductor spaces disposed within a tube defining a pathway for suction fluid flow.

BACKGROUND

Fluid eductors may be implemented in a wide variety of contexts, including turbomachine engine systems and heat exchange systems, among others. Fluid eductor systems are used to eject a motive fluid into a suction fluid flow. The motive fluid is ejected at a velocity that is greater than the native velocity of the suction fluid flow. The motive fluid entrains some of the surrounding suction fluid, thereby accelerating the suction fluid flow. The higher velocity of the motive fluid decreases local static pressure in the suction fluid flow, which causes the motive fluid to entrain and accelerate nearby suction fluid.

Conventional fluid eductors may not fully entrain the suction fluid flow, and further, the dimensions of mixing tubes that provide adequate entrainment may be too large for implementations with limited available space. For example, some conventional fluid eductors may require a mixing tube length to diameter ratio of 6:1 or greater, which may render a conventional fluid eductor infeasible for a given application, particularly where space is limited. Therefore, there exists a need for improved fluid eductors, such as eductors that provide improved entrainment of suction fluid flow. There further exists a need for improved fluid entrainment and mixing systems such as those used in turbomachine engine systems and/or a heat exchange systems, and for improved heat exchange between fluids in heat exchange systems. Moreover, there exists a need for improved methods of entraining a suction fluid flow in systems such as turbomachine engine systems, and improved methods of exchanging heat in heat exchange systems.

BRIEF DESCRIPTION

Aspects and advantages will be set forth in part in the following description, or may be obvious from the description, or may be learned through practicing the presently disclosed subject matter.

In one aspect, the present disclosure embraces various embodiments of a fluid eductor and combinations thereof. An exemplary fluid eductor includes a first motive fluid annulus and an annular eductor cap connected to the first motive fluid annulus. The first motive fluid annulus may extend circumferentially about an axis, and may have an open-end and a closed-end. An interior surface of the first motive fluid annulus may define a first motive fluid delivery chamber. An exterior surface of the first motive fluid annulus may have a substantially concentric outward-facing exterior surface and inward-facing exterior surface. The annular eductor cap may extend circumferentially about the axis and may define a substantially semicircular annulus. At least a portion of an interior surface of the annular eductor cap may concentrically envelop the open-end of the first motive fluid annulus. At least a portion of the interior surface of the annular eductor cap and the open-end of the first motive fluid annulus may define a concentric eductor space. The concentric eductor space may have a substantially concentric first annular eductor space and second annular eductor space. The first annular eductor space may be defined at least in part by a portion of the interior surface of the annular eductor cap and a portion of the outward-facing exterior surface of the first motive fluid annulus. The second annular eductor space may be defined at least in part by the interior surface of the annular eductor cap and a portion of the inward-facing exterior surface of the first motive fluid annulus.

An exemplary fluid eductor may include a first Coanda surface defining a transition from the interior surface of the first motive fluid annulus to the outward-facing exterior surface of the first motive fluid annulus, and/or a second Coanda surface defining a transition from the interior surface of the first motive fluid annulus to the inward-facing exterior surface of the first motive fluid annulus. The first Coanda surface may define at least a portion of the first annular eductor space, and the second Coanda surface may define at least a portion of the second annular eductor space. The outward-facing exterior surface of the first motive fluid annulus may define a first motive flow Coanda surface and a first motive flow guiding surface, and/or the inward-facing exterior surface of the first motive fluid annulus may define a second motive flow Coanda surface and a second motive flow guiding surface.

In some embodiments, an exemplary fluid eductor may include a second motive fluid annulus extending circumferentially about the axis and being substantially concentric to the first motive fluid annulus. The second motive annulus may have an open-end and a closed-end. An interior surface of the second motive fluid annulus may define a second motive fluid delivery chamber. An exterior surface of the second motive fluid annulus may include a substantially concentric outward-facing exterior surface and inward-facing exterior surface. The exemplary fluid eductor may include at least one motive fluid distribution spoke operably coupling the first motive fluid delivery chamber to the second motive fluid delivery chamber. A third annular eductor space may be defined at least in part by the interior surface of the open-end of the second motive annulus. The third annular eductor space may be substantially concentric to the first annular eductor space and/or the second annular eductor space. The open-end of the second motive fluid annulus may extend along the axis beyond the closed-end of the first motive fluid annulus. The outward-facing exterior surface of the second motive fluid annulus may define a first secondary flow Coanda surface, and/or the inward-facing exterior surface of the second motive fluid annulus may define a second secondary flow Coanda surface.

The exemplary fluid eductor may include at least one motive fluid supply inlet positioned about the exterior surface of the first motive fluid annulus. The exemplary fluid eductor may further include at least one motive fluid supply line operably coupled to the first motive fluid delivery chamber to supply the motive fluid to the first motive fluid delivery chamber. The fluid eductor may be configured to eject a motive fluid out of the concentric eductor space. The motive fluid may include ambient air or an inert gas. The fluid eductor is disposed within a tube defining a suction fluid pathway. The tube may be positioned downstream from a heat exchanger, and the fluid eductor may be used to draw the suction fluid through the heat exchanger to cool a stream of hot fluid. As an example, the stream of hot fluid may include oil from a turbomachine engine. As examples, the heat exchanger may take the form of an air-cooled-oil-cooler, and the hot fluid may include oil and the suction fluid may include ambient air or an inert gas.

In another aspect, the present disclosure embraces a heat transfer system. An exemplary heat transfer system may include a tube defining a suction fluid pathway, a heat exchanger defining a cooling fluid pathway and a portion of the suction fluid pathway, a fluid eductor disposed within the suction fluid pathway downstream from the heat exchanger, and a motive fluid supply line operably coupled to the fluid eductor. The heat exchanger may be configured and arranged to exchange heat between a cooling fluid in the cooling fluid pathway and a suction fluid in the suction fluid pathway. The fluid eductor may be configured in any manner in accordance with the present disclosure. In an exemplary embodiment, the fluid eductor may include a peripheral motive fluid annulus that includes a peripheral motive fluid delivery chamber, a core motive fluid delivery chamber, and at least one motive fluid distribution spoke providing fluid communication between the peripheral motive fluid delivery chamber and the core motive fluid delivery chamber. The peripheral motive fluid delivery chamber may be in fluid communication with a first annular eductor space and a second annular eductor space. The second annular eductor space may be positioned substantially concentric with the first annular eductor space. The a core motive fluid delivery chamber may be in fluid communication with a third annular eductor space and positioned substantially concentric with the first annular eductor space and the second annular eductor space.

In an exemplary embodiment, a first inward surface of an annular eductor cap and a first Coanda surface may together at least partly define a first annular eductor space. The first Coanda surface may be proximal to a transition from an interior surface of the peripheral motive fluid annulus to an outward-facing exterior surface of the peripheral motive fluid annulus. The interior surface may define a peripheral motive fluid delivery chamber and the outward-facing exterior surface may define a first annular guiding surface extending downstream from the first annular eductor space. A second inward surface of the annular eductor cap and a second Coanda surface may together at least partly define a second annular eductor space. The second Coanda surface may be proximal to a transition from the interior surface of the peripheral motive fluid annulus to an inward-facing exterior surface of the peripheral motive fluid annulus. The inward-facing exterior surface may define a second annular guiding surface extending downstream from the second annular eductor space. Additionally, or in the alternative, at least a portion of the interior surface of the core motive fluid delivery chamber may define a third annular eductor space.

In yet another aspect, the present disclosure embraces methods of entraining a suction fluid flow using a fluid eductor. An exemplary method includes supplying motive fluid to a fluid eductor, ejecting a volume of motive fluid out of a concentric eductor space of the fluid eductor, accelerating a peripheral region of the suction fluid flow with the motive fluid ejecting out of the first annular eductor space, and accelerating a core region of the suction fluid flow with the motive fluid ejecting out of the second annular eductor space. The fluid eductor may be disposed within a tube defining a suction fluid pathway. The concentric eductor space may include a substantially concentric first annular eductor space and second annular eductor space. In some embodiments, an exemplary method may further include ejecting an additional volume of motive fluid out of a third annular eductor space of the fluid eductor, and accelerating the core region of the suction fluid flow with the motive fluid ejecting out of the third annular eductor space. The third annular eductor space may be positioned substantially concentric with the concentric eductor space. As an example, the suction fluid flow may be a cooling fluid in a heat exchange system. The heat exchange system may be used to cool oil from a turbomachine engine.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 7A is a partial perspective view of an exemplary fluid eductor with a spiral configuration;

FIG. 7B is a partial cutaway perspective view of the exemplary fluid eductor of FIG. 7A;

Figure 1:
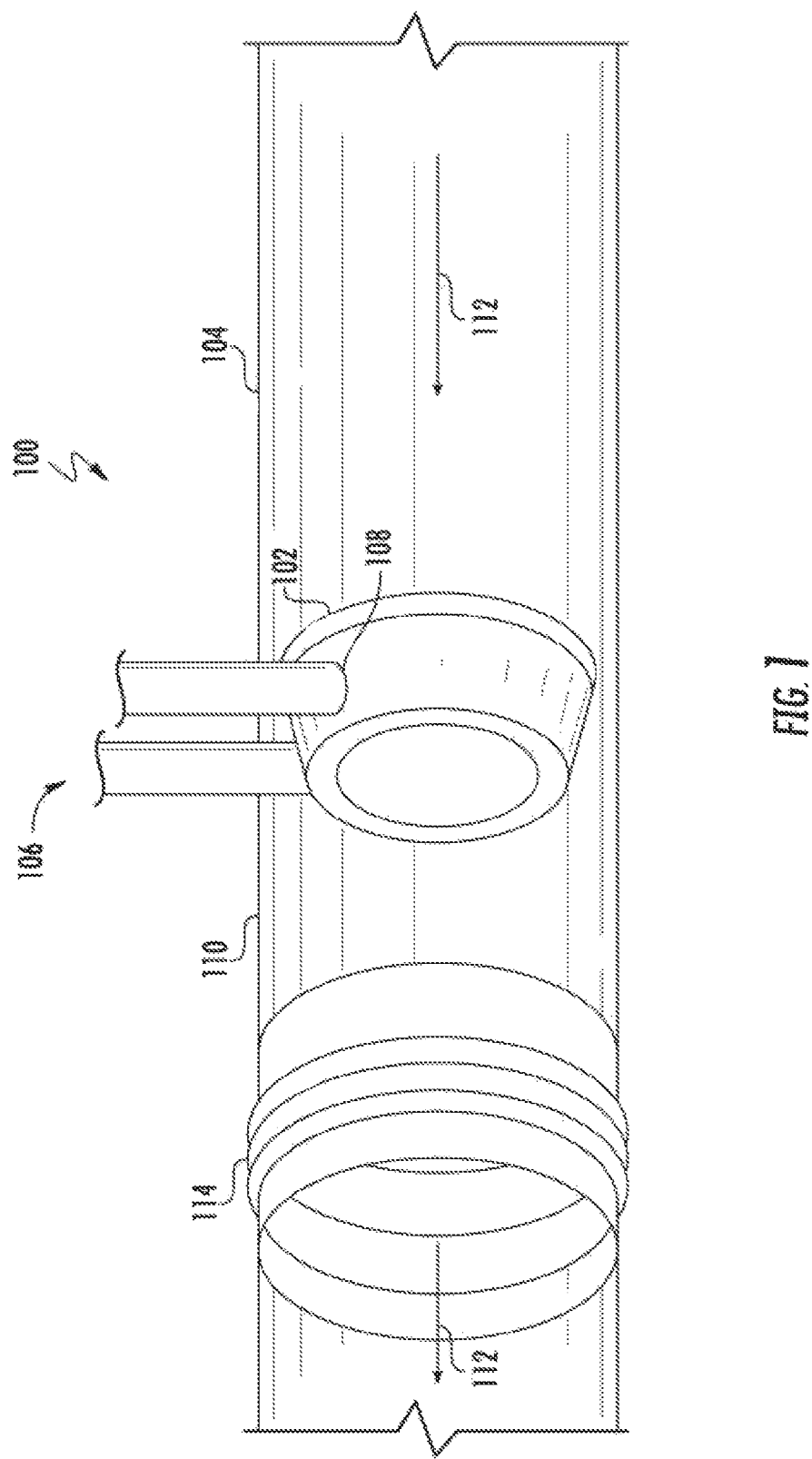
FIG. 1 schematically shows an exemplary fluid eductor system including a fluid eductor configured according to one embodiment.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

The presently disclosed fluid eductors provide for improved entrainment and mixing of a suction fluid flow, such as in a turbomachine engine system or a heat exchange system. Exemplary fluid eductors include a concentric eductor space with a plurality of annular eductor spaces that have a substantially concentric orientation relative to one another. These annular eductor spaces direct motive fluid to an annular eductor mouth, where the motive fluid is ejected, providing an annular jet which entrains and accelerates a region of the suction fluid flow. An annular eductor space refers to a void area located between two opposing surfaces through which motive fluid flows just prior to being ejected out of an annular eductor mouth.

Referring to FIG. 1, an exemplary eductor system 100 is shown. The exemplary eductor system 100 includes an eductor 102 positioned within a mixing tube 104. One or more motive fluid supply lines 106 each are operably coupled to the eductor 102 at a motive fluid supply inlet 108. The one or more motive fluid supply lines 106 supply a motive fluid to the eductor 102. The motive fluid may be a liquid or a gas, or a combination of liquid and gas, such as gaseous vapor. The motive fluid may be supplied from a bleed line that extracts relatively high pressure air or gasses from a compressor section or a turbine section of a turbomachine engine, as discussed below with reference to FIG. 2. Motive fluid also may be provided from a pump, from a compressor, such as a pump or compressor (not shown) used in an auxiliary system for a turbomachine engine. Additionally, motive fluid may be provided from an auxiliary power unit (not shown), such as on an aircraft. For example, the motive fluid may be extracted from a compressor stage of such an auxiliary power unit.

As discussed in more detail below, the eductor 102 ejects a volume of motive fluid into a mixing tube 110 that defines a pathway for suction fluid flow 112. The motive fluid flow is supplied to the eductor at a higher pressure than the suction fluid flow 112. As the motive fluid travels and is ejected from the motive fluid conduit 102, the velocity of the motive fluid increases and the pressure of the motive fluid decreases below the pressure of the suction fluid flow 112, providing a pressure gradient between the suction fluid and the motive fluid. This pressure gradient draws or accelerates the suction fluid flow 112 past the motive fluid conduit 102. This is referred to as the Venturi effect. As the suction fluid is drawn past the eductor 102, the suction fluid mixes with the motive fluid and energy is exchanged between the two fluids. The eductor 102 thereby entrains and accelerates at least a region of the suction fluid. In some embodiments the mixing tube 110 may include a plurality of undulations 114, such as ridges, valleys, ripples, dimples, or the like. These undulations 114 are intended to create turbulence in the suction fluid flow 112, thereby further mixing and entraining the suction fluid.

In some embodiments, an eductor system 100 may include a plurality of eductors 102, which may be configured to operate separately or in cooperation with one another. Eductors 102 configured to operate in cooperation with one another may be concentrically nested, or positioned in parallel or series with one another. An exemplary eductor system 100 may be implemented in numerous various capacities in a turbomachine engine system and/or a heat exchange system, some of which are described herein. It is to be appreciated that the presently disclosed eductor system 100 may be implemented in even further different or additional capacities in a turbomachine engine system and/or a heat exchange system, as well as in other contexts, without departing from the spirit and scope of the present disclosure. The examples presently disclosed are not to be taken in a limiting sense, and it is intended that other implementations are within the spirit and scope of the present disclosure.

Figure 2:
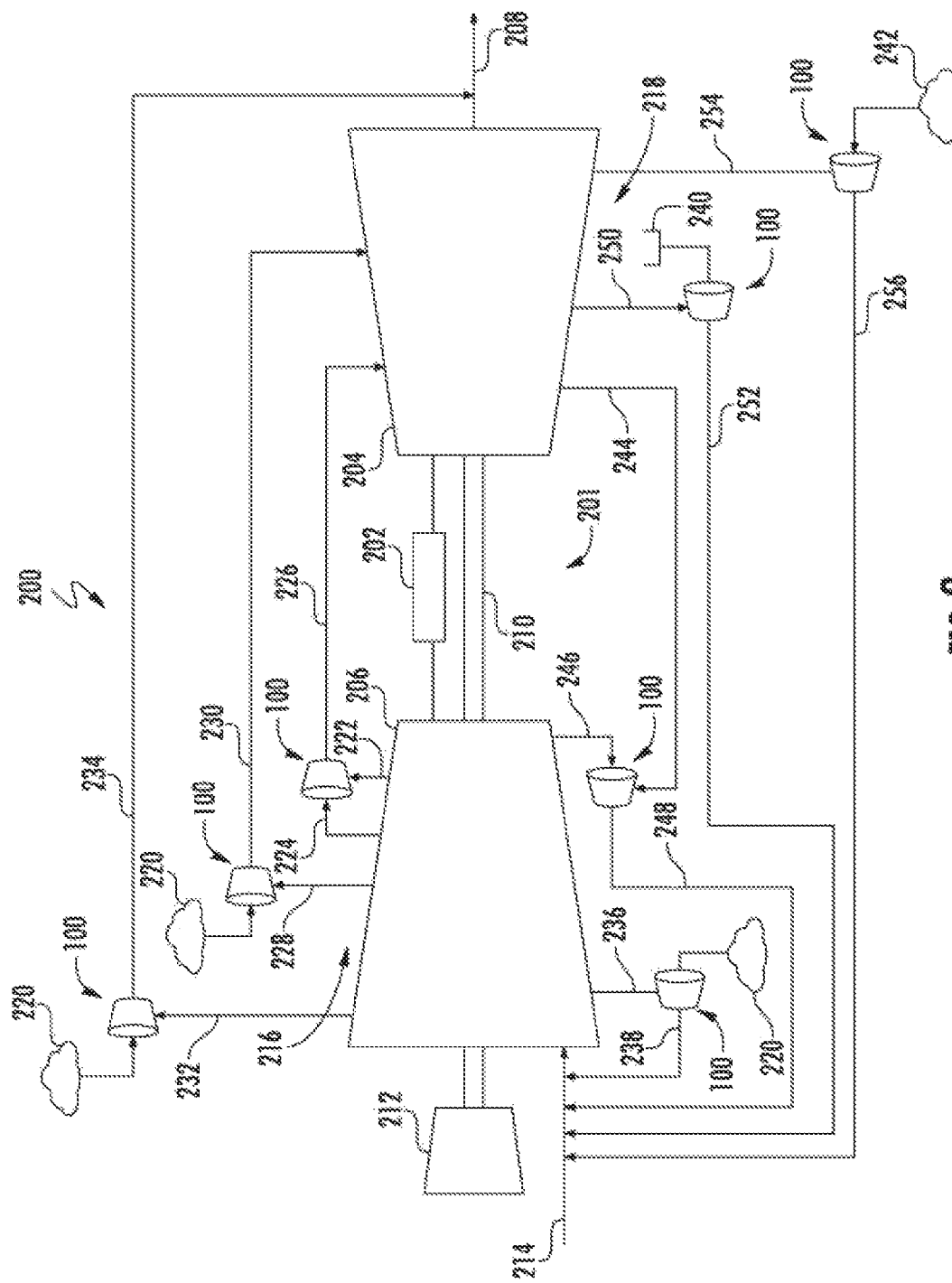
FIG. 2 shows a block diagram of an exemplary turbomachine engine system that includes various exemplary fluid eductors configured in accordance with one embodiment.

Now referring to FIG. 2, a block diagram of an exemplary turbomachine engine system 200 is shown, which depicts various implementations of an exemplary eductor system 100. One or more eductor systems 100 may be used to accelerate or entrain compressor exhaust gas (CEG), which may be used for cooling a turbomachine engine or purging exhaust gas from a turbomachine engine among other things. Additionally, or in the alternative, one or more eductor systems 100 may be used to accelerate or entrain turbine exhaust gas, which may be used for heating a compressor inlet flow to a turbomachine engine. The exemplary turbomachine engine system 200 includes a turbomachine engine 201. The turbomachine engine 201 includes a combustor 202 which directs a flow of combustion products through a turbine 204. The combustor 202 may use liquid or gas fuel, such as a hydrogen rich synthetic gas and/or natural gas. One or more fuel nozzles intake the fuel, mix the fuel with compressed airflow from a compressor 206, and distribute the air-fuel mixture into the combustor 202 in a suitable ratio for optimal combustion, emissions, fuel consumption, and power output. The air-fuel mixture combusts within the combustor 202, thereby creating a flow of hot pressurized combustion products. The turbine 204 may include one or more stages. The combustion products flow through the one or more stages of the turbine towards an exhaust outlet 208.

As the combustion product flow passes through the turbine 204, the combustion product flow forces turbine blades of each stage of the turbine to rotate a shaft 210 along an axis of the turbomachine engine system 200. The shaft 210 may be connected to various components of the turbomachine engine system 200, including a load 212 and the compressor 206. The load 212 may be a part of a vehicle or a stationary load, such as a propeller on an aircraft or an electrical generator in a power plant, for example. The load 212 may include any suitable device capable of being powered by the rotational output of the gas turbine system 200. The compressor 206 also includes one or more stages with blades coupled to the shaft 210. As the shaft 210 rotates, the blades within the compressor 206 also rotate, thereby compressing an inlet flow 214 through the compressor 206 and into the combustor 202 and/or the fuel nozzles thereof. The flow of combustion products pass through the turbine 204 as turbine gas and exit the exhaust outlet 208 as exhaust gasses. The exhaust gas may be a source of thrust, such as in a turbofan engine, or the exhaust gas may be sent to an exhaust stack, a heat recovery steam generator, or elsewhere in the case of a turbomachine engine used for electric power generation or a marine vessel.

In some embodiments, a turbomachine engine system 200 may include a compressor bleed system 216. The compressor bleed system 216 may bleed (e.g., extract) a flow of compressor extraction gas (CEG) from the compressor 206 for use within the turbomachine engine system 200 for various purposes. Additionally, or in the alternative, in some embodiments, a turbomachine engine system may include a turbine gas extraction system 218. The turbine gas extraction system 218 may extract a flow of turbine extraction gas (TEG) for use within the turbomachine engine system 200 for various purposes. The compressor bleed system 216 and/or the turbine gas extraction system 218 may include one or more eductor systems 100 as described in more detail below.

The compressor bleed system 216 may extract a flow of CEG prior to the last stage of the compressor 206 (e.g., from an intermediate stage), and/or from an output of the compressor 206 (e.g., after the last stage). A pressurized flow from the compressor 206 may be directed through the compressor bleed system 216. The pressurized flow may include a portion of the CEG flow and/or an external flow 220. The external flow 220 may include, but is not limited to a water flow, a steam flow, an air flow drawn from the ambient environment, or any combination thereof. In some embodiments, the pressurized flow may be directed through the compressor bleed system 216 for various purposes, including to heat the inlet flow 214, to release excess pressure produced by the compressor 206, to protect the combustor 202 and/or to protect the turbine 204 from surge or stall conditions, to cool the combustion product flow, to dilute the combustion product flow, to entrain the combustion product flow through the turbine 204 toward the exhaust outlet 208, to cool the turbine 204, and so forth.

An eductor system 100 may be utilized in a compressor bleed system 216 to entrain various fluid flows. For example, an eductor system 100 may utilize a CEG flow 222 from a downstream stage of the compressor 206 as a motive fluid to entrain a CEG flow 224 from a stage of the compressor 206, and the combined CEG flow 226 may be introduced into the turbine 204 for various purposes. Alternatively, or in addition, an eductor system 100 may utilize a CEG flow 228 as a motive fluid to entrain an external flow 220, and the combined CEG/external flow 230 may be introduced into the turbine 204 for various purposes. Further in addition or in the alternative, an eductor system 100 may utilize a CEG flow 232 as a motive fluid to entrain an external flow 220, and the combined CEG/external flow 234 may be introduced into the exhaust outlet 208, such as to entrain exhaust gasses, and so forth. Even further in addition or in the alternative, an eductor system 100 may utilize a CEG flow 236 as a motive fluid to entrain an external flow 220, and the combined CEG/external flow 238 may be used to heat the inlet flow 214 to the compressor 206.

In some embodiments, one or more eductor systems 100 may use a CEG flow 222, 228, 232 as a motive fluid to entrain a suction fluid flow 112, such as an external flow 220 or a CEG flow 224. The combined CEG/external flow 226, 230, 234 may be used to cool various stages of the turbine 204. The eductor systems 100 may be part of a turndown cooling system, for cooling the various stages of the turbine 204 during low turndown operations. The source of the CEG flow may be a ninth stage compressor bleed air extraction, a thirteenth stage compressor bleed air extraction, and/or an extraction from elsewhere. For example, the thirteenth stage compressor bleed air extraction may be used to cool a second stage of the turbine 204. In another example, the ninth stage compressor bleed air extraction may be used to cool a third stage or other later stage of the turbine 204. The presently disclosed eductor systems 100 may improve turbine cooling during low turndown operations. For example, an eductor system 100 may improve the ability to maintain a desired fuel-air ratio, relative to other fluid eductors, thereby reducing turbine emissions, maintaining exhaust gas temperatures within temperature limits, and improving overall turbomachine engine operating range and capacity.

The turbine gas extraction system 218 may extract a flow of TEG prior to the last stage of the turbine 204 (e.g., from an intermediate stage). A pressurized flow from the turbine 204 may be directed through the turbine gas extraction system 218, for example, to heat the inlet flow 214 to the compressor 206. The pressurized flow may include a portion of the TEG flow, a turbine compartment airflow 240, and/or an external flow 242. The external flow 242 may include, but is not limited to a water flow, a steam flow, an air flow drawn from the ambient environment, or any combination thereof.

An eductor system 100 may be utilized in a turbine gas extraction system 218 to entrain various fluid flows. For example, an eductor system 100 may utilize a TEG flow 244 as a motive fluid to entrain a CEG flow 246 from a stage of the compressor 206, and the combined TEG/CEG flow 248 may be used to heat the inlet flow 214 to the compressor 206. Alternatively, or in addition, an eductor system 100 may utilize a TEG flow 250 as a motive fluid to entrain a turbine compartment airflow 240, and the combined TEG/compartment flow 252 may be used to heat the inlet flow 214 to the compressor 206. Further in addition or in the alternative, an eductor system 100 may utilize a TEG flow 254 as a motive fluid to entrain an external flow 242, and the combined TEG/external flow 256 may be used to heat the inlet flow 214 to the compressor 206.

Figure 3:
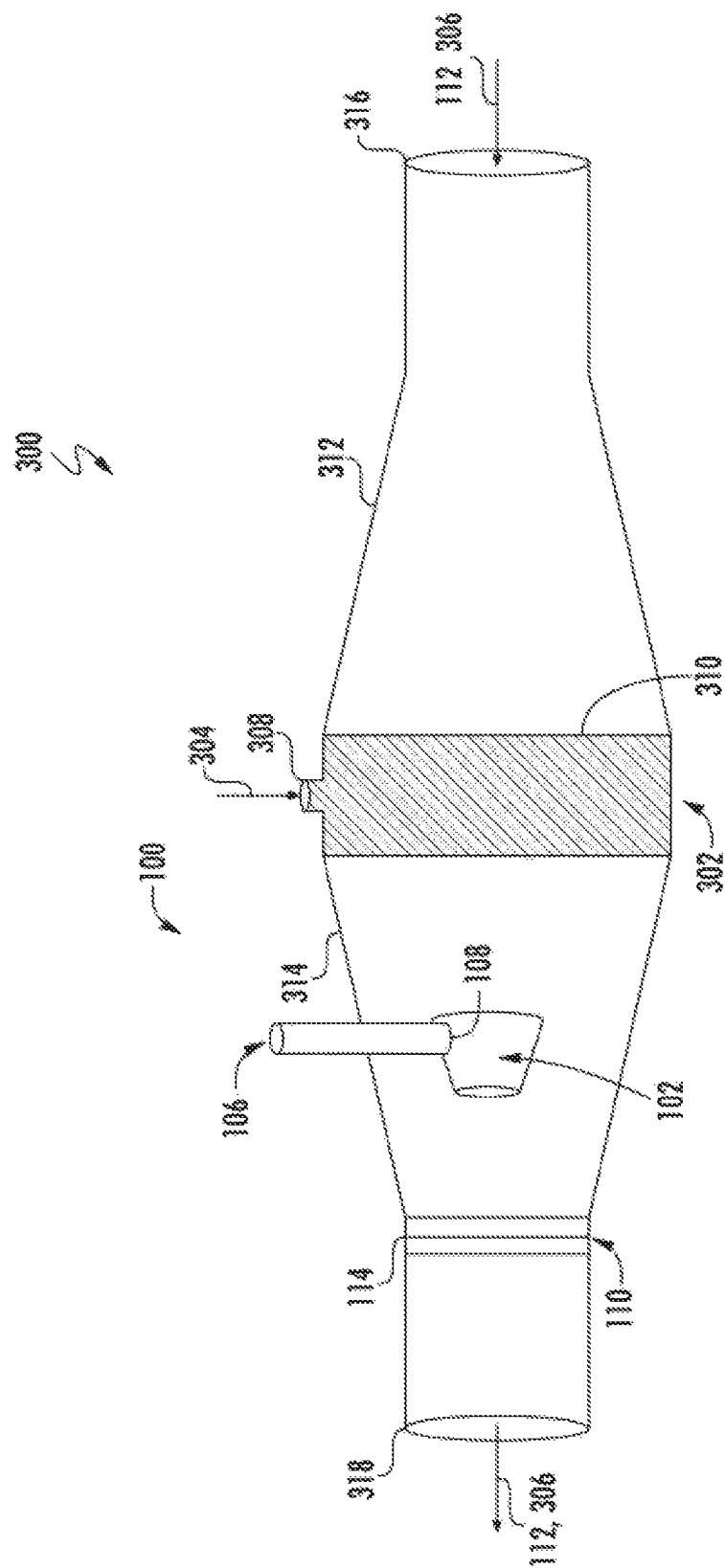
FIG. 3 schematically shows an exemplary heat exchange system that includes an exemplary fluid eductor configured in accordance with one embodiment.

In some embodiments, an eductor system 100 may be used to entrain a fluid flow in a heat exchange system. For example, referring to FIG. 3, an exemplary heat exchange system 300 is shown. The exemplary heat exchange system 300 may be an air-cooled oil cooler, which for example can be used to cool oil from a turbomachine engine. An eductor system 100 may be included in the heat exchange system to entrain and accelerate a flow of air through the air-cooled oil cooler.

For example, a turbomachine engine in a turbofan powered aircraft may use an air scoop to supply airflow to an air-cooled oil cooler. During flight, the airspeed of the aircraft provides a motive force to ram air through the air scoop and into the heat exchange system. However, when on the ground, a fluid eductor may be used to draw air through the heat exchange system, as a stationary aircraft lacks the air speed necessary to provide sufficient ram air. Similarly, a heat exchange system that otherwise typically remains stationary may utilize a fluid eductor to draw fluid through the heat exchange system. Additionally, an eductor system 100 may be employed in any other heat exchange system to entrain and accelerate one or both fluid streams through the heat exchange system.

The heat exchange system 300 includes a heat exchanger 302 with a first fluid pathway (e.g., a cooling fluid pathway) 304 and a second fluid pathway (e.g. a suction fluid pathway) 306. The cooling fluid pathway 304 and the suction fluid pathway 306 are configured and arranged to exchange heat between a first fluid (e.g., a cooling fluid) flowing through the cooling fluid pathway and a second fluid (e.g., a suction fluid) flowing through the suction fluid pathway. The cooling fluid may be a liquid or a gas, or a combination of liquid and gas. The suction fluid also may be a liquid or a gas, or a combination of liquid and gas. By way of example, the cooling fluid may be at a relatively high temperature and the suction fluid may be at a relatively low temperature, or vice versa. The cooling fluid pathway and the suction fluid pathway may be in thermal contact or close proximity, allowing heat from the cooling fluid to be passed to the suction fluid, or vice versa. Thus, the temperature of the cooling fluid may be decreased and the temperature of the suction fluid may be increased, or vice versa.

As shown, a supply header 308 and a plurality of tubes or channels 310 define the cooling fluid pathway. Fluid entering the supply header 308 flows through the plurality of tubes or channels 310 and exits through a discharge header (not shown). A suction fluid pathway includes a suction fluid supply tube 312 operably coupled to an upstream side of the heat exchanger 302, and a suction fluid discharge tube 314 operably coupled to a downstream side of the heat exchanger 302.

In some embodiments, the cooling fluid may include oil and the suction fluid may include ambient air or an inert gas. For example, the heat exchange system 300 may be an air-cooled oil cooler. Accordingly, in an exemplary embodiment, the heat exchange system 300 may include an air scoop 316 to introduce air into the suction fluid pathway and an outlet manifold 318 to allow air to exit the suction fluid pathway. Alternatively, in other embodiments the heat exchange system may include some other inlet source and/or some other outlet for the suction fluid to enter and exit the suction fluid pathway. As shown, a fluid such as ambient air entering through the air scoop 316, flows through the suction fluid pathway 306, and discharges from the outlet manifold 318. The suction fluid flowing through the suction fluid pathway 306 exchanges heat with the cooling fluid flowing through the cooling fluid pathway 304. In the case of an air-cooled oil cooler, oil flowing through the cooling fluid pathway transfers heat to air flowing through the suction fluid pathway 306.

In accordance with the present disclosure, a fluid eductor 102 is disposed within the suction fluid pathway 306. The fluid eductor 102 may be located either upstream or downstream from the heat exchanger 302. One or more motive fluid supply lines 106 each are operably coupled to the fluid eductor 102 at a motive fluid supply inlet 108. The one or more motive fluid supply lines 106 supply a motive fluid to the fluid eductor 102. The motive fluid may be a liquid or a gas, or a combination of liquid and gas. The motive fluid may be supplied from a pump or compressor (not shown), or any other suitable source. The motive fluid may be provided from an auxiliary power unit (not shown), such as on an aircraft. For example, the motive fluid may be compressed air extracted from a compressor stage of the auxiliary power unit.

An exemplary heat exchange system 300 may be employed in any desirable environment, including within the context of a turbomachine engine such as in a turbofan engine used to power an aircraft. For example, the heat exchanger 302 may be an air-cooled oil cooler used for cooling oil circulating through the turbomachine engine. Additionally, an exemplary heat exchange system 100 may be employed in any other context within the contemplation of those skilled in the art, including without limitation, heat exchangers used in other turbomachine engines, machinery, vehicles, or marine vessels.

Various embodiments of a fluid eductor 102 will now be discussed with reference to FIGS. 4A and 4B, 5A and 5B, 6, 7A and 7B, 8A and 8B, and 9. As shown, for example, in FIGS. 4A and 4B, an exemplary fluid eductor 102 includes a concentric eductor space 400 with a plurality of annular eductor spaces extending circumferentially about an axis 402 with a substantially concentric orientation relative to one another. In some embodiments, the concentric eductor space 400 may include a first annular eductor space 404 and a second annular eductor space 406. The first annular eductor space 404 and the second annular eductor space 406 may have a substantially concentric orientation relative to one another. The first annular eductor space 404 directs motive fluid to a first annular eductor mouth 408, and the second annular eductor space 406 directs motive fluid to a second annular eductor mouth 410. Motive fluid ejecting out of the first annular eductor mouth 408 provides a first annular jet 412, which entrains and accelerates a peripheral region 414 of the suction fluid flow 112. Motive fluid ejecting out of the second annular eductor mouth 410 provides a second annular jet 416, which entrains and accelerates a core region 418 of the suction fluid flow 112.

Motive fluid from one or more motive fluid supply lines 106 is distributed to the concentric eductor space 400 by way of a motive fluid annulus 420. The motive fluid annulus 420 extends circumferentially about the axis 402. The motive fluid annulus 420 may have any desired annular configuration. For example, a motive fluid annulus 420 may have a substantially u-shaped, v-shaped, or airfoil-shaped cross-sectional profile. Other cross-sectional profiles also may be provided, including substantially cylindrical, oval, curvilinear, polyhedral, or any other desired cross-sectional profile.

In some embodiments, a motive fluid annulus 420 includes a closed-end 422, and an open-end 424 leading to the concentric eductor space 400 or the plurality of annular eductor spaces. An interior surface of the motive fluid annulus 420 defines a first motive fluid delivery chamber 426. An exterior surface of the motive fluid annulus includes an outward-facing exterior surface 428 and an inward-facing exterior surface 430. The outward-facing exterior surface 428 and the inward-facing exterior surface 430 have a substantially concentric orientation relative to one another. The outward-facing exterior surface 428 includes one or more motive fluid supply inlets 108, where one or more corresponding motive fluid supply lines 106 may be operably coupled to provide motive fluid to the motive fluid delivery chamber 426.

Figure 4A:
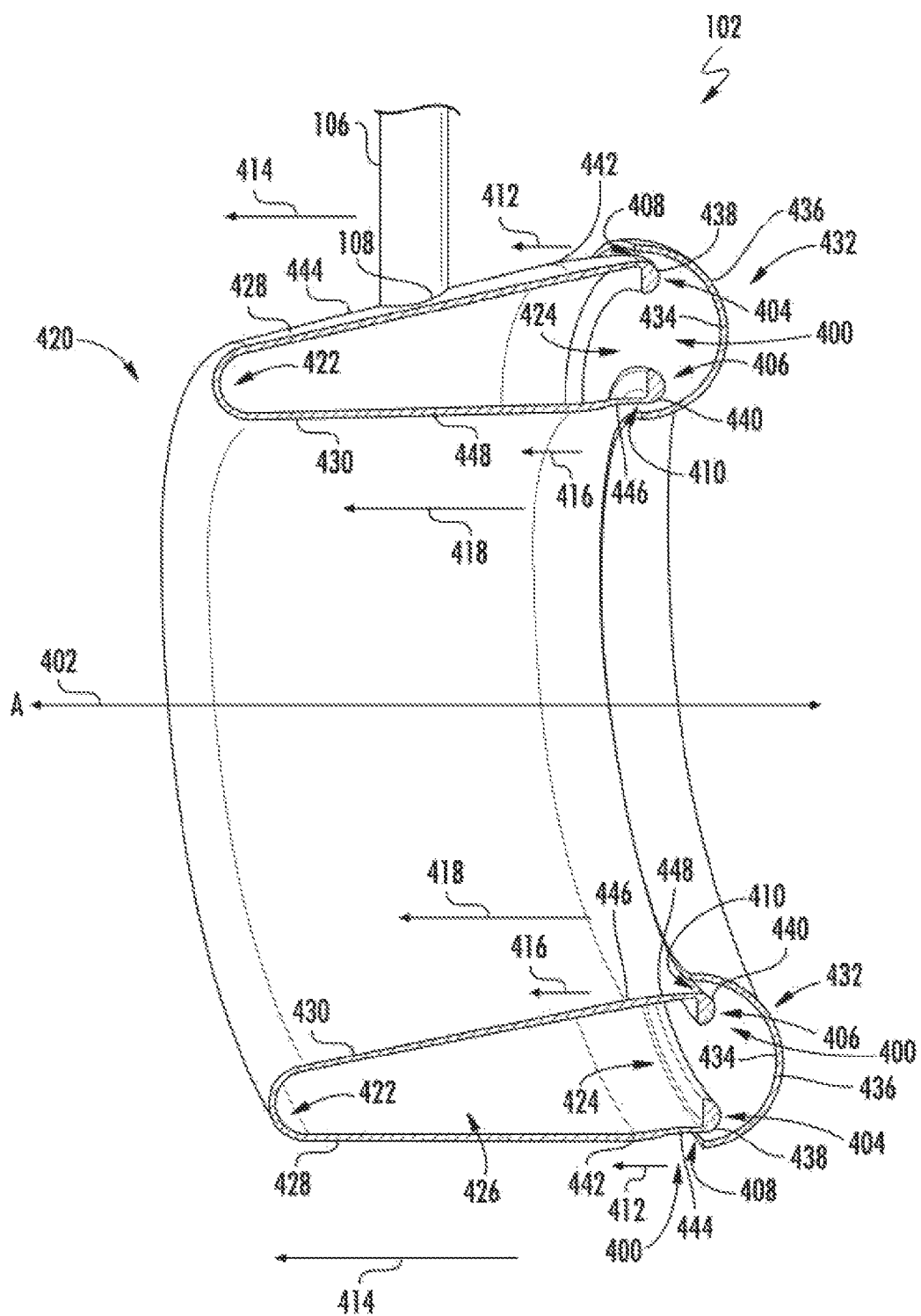
FIG. 4A is a cross-sectional perspective view of an exemplary eductor having a concentric eductor space or a plurality of annular eductor spaces.
Figure 4B:
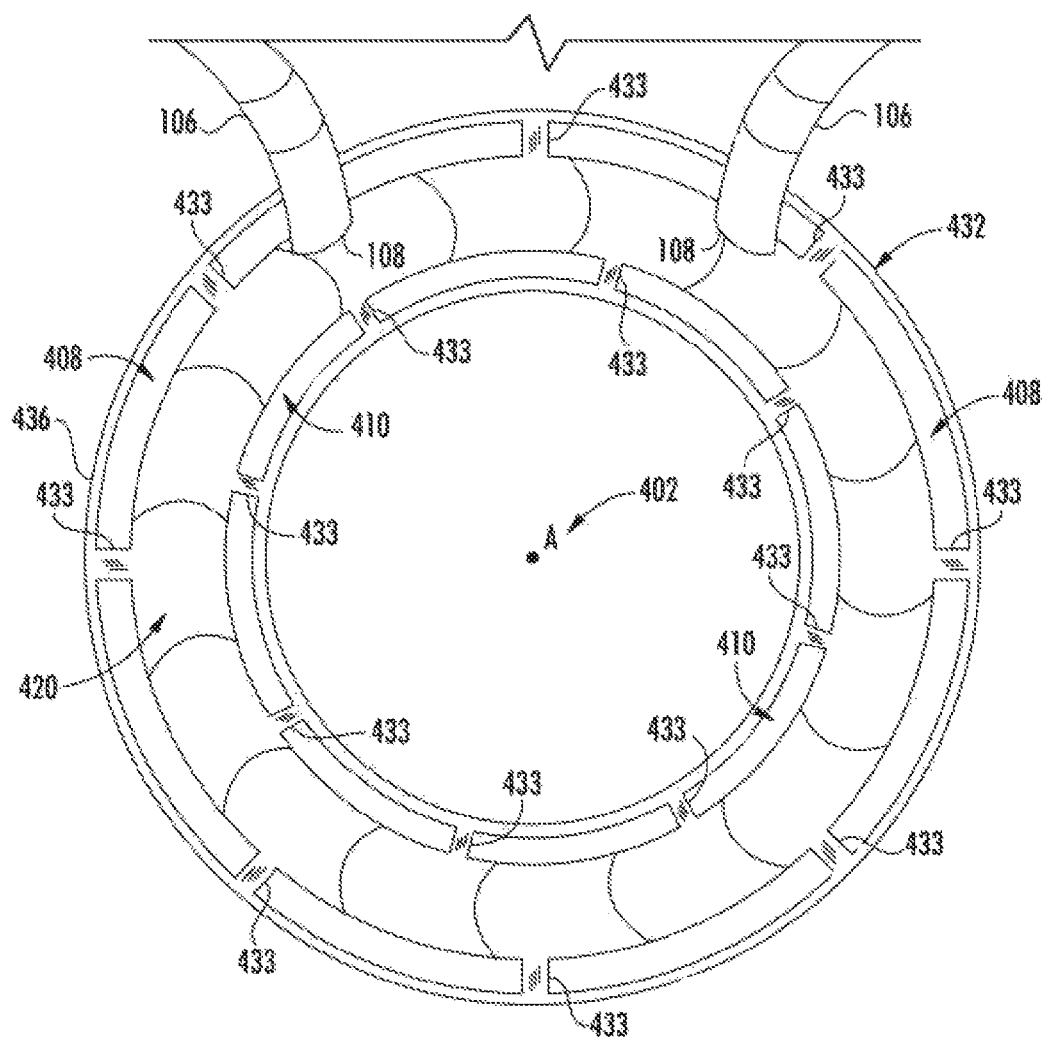
FIG. 4B is an upstream perspective view of the exemplary eductor of FIG. 4A.

The exemplary eductor 102 includes an annular eductor cap 432 connected (e.g., integrally connected or operably coupled) to the motive fluid annulus 420 by a series of eductor posts 433. These eductor posts 433 are shown in FIG. 4B, which provides an upstream perspective view of the eductor of FIG. 4A. The annular eductor cap 432 and the motive fluid annulus 420 may be integrally connected to one another or otherwise fastened together by the eductor posts 433. The annular eductor cap 432 directs motive fluid to the first annular eductor space 404 and to the second annular eductor space 406. The motive fluid may then be ejected out of the first annular eductor mouth 408 and the second annular eductor mouth 410. The dimensions and configuration of the eductor posts 433 may be selected to define the dimensions and configuration of the first annular eductor mouth 408 and/or the second annular eductor mouth 410. The eductor posts may be airfoil-shaped (e.g., symmetric NACA series airfoil-shaped) to reduce interference with the motive fluid ejecting out of the first annular eductor mouth 408 and the second annular eductor mouth 410, and/or to optimize the characteristics of the first annular jet 412 and the second annular jet 416. In some embodiments, the eductor posts 433 may be configured to impart a swirling action to the first annular jet 412 and the second annular jet 416.

The annular eductor cap 432 has an interior surface 434 and an exterior surface 436. The annular eductor cap 432 extends circumferentially about the axis 402 and concentrically envelops the open-end 424 of the motive fluid annulus 420. An annular eductor cap 432 may have any desired annular configuration. For example, an annular eductor cap may have a substantially semicircular, u-shaped, v-shaped, or airfoil-shaped cross-sectional profile. Other cross-sectional profiles also may be provided, including substantially cylindrical, oval, curvilinear, polyhedral, or any other desired cross-sectional profile. As shown, the annular eductor cap 432 defines a substantially semicircular annulus such that at least a portion of the interior surface of the annular eductor cap 432 concentrically envelops the open-end 424 of the motive fluid annulus 420.

Various aspects of the annular eductor cap 432 and the motive fluid annulus 420 define the concentric eductor space 400 and/or a plurality of annular eductor spaces. For example, aspects of the interior surface 434 of the annular eductor cap 432 and aspects of the exterior surface 428, 430 of the motive fluid annulus 420 may together define an annular eductor space, and/or aspects of the interior surface 434 of the annular eductor cap 432 and aspects of a transition region from the interior surface to the exterior surface of the motive fluid annulus may together define an annular eductor space. In some embodiments, the interior surface 434 of the annular eductor cap 432 and a portion of the outward-facing exterior surface 428 of the motive fluid annulus 420 together define the first annular eductor space 404. Similarly, in some embodiments the interior surface 434 of the annular eductor cap 432 and a portion of the inward-facing exterior surface 430 of the motive fluid annulus 420 together define the second annular eductor space 406.

In some embodiments, one or more Coanda surfaces may be provided at various locations about the interior or exterior of the motive fluid annulus 420 and/or at various locations about the annular eductor cap 432. A "Coanda surface" refers to a curved surface that creates a zone of reduced pressure in the immediate proximity of such curved surface. This pressure drop entrains and accelerates fluid along the contour of the surface, which is sometimes referred to as the "Coanda effect." The Coanda effect is the phenomena in which a jet flow attaches itself to a nearby surface and remains attached even when the surface curves away from the initial direction of a jet of fluid. Characteristic of the Coanda effect, accelerating fluid tends to flow over the surface closely, seemingly "clinging to" or "hugging" the surface. As such, the Coanda effect can be used to change the jet direction. In doing so, the rate at which the jet mixes is often significantly increased compared with that of an equivalent free jet.

A Coanda surface may be included at one or more locations of a fluid eductor 102. By way of example, a Coanda surface may be included at an annular eductor space 404, 406 located upstream of an annular eductor mouth, or an annular eductor space may be located partly upstream of an annular eductor mouth 408, 410 and partly downstream of the annular eductor mouth 408, 410, or a Coanda surface may be located entirely downstream of an annular eductor mouth 408, 410. A Coanda surface may be provided proximal to a transition from an interior surface of the motive fluid annulus to an outward-facing exterior surface of the motive fluid annulus. A Coanda surface may define at least a portion of an annular eductor space 404, 406, and/or at least a portion of an annular eductor mouth 408, 410. In some embodiments, a Coanda surface may at least partially direct fluid flow to an eductor mouth 408, 410. Additionally or in the alternative, a Coanda surface may define a transition from the interior surface to the exterior surface of the motive fluid annulus 420 and may extend beyond the exit of an annular eductor mouth 408, 410. For example, a Coanda surface may be provided at an interior surface of the motive fluid annulus 420, and/or at an interior surface 434 of the annular eductor cap 432, such as at a portion thereof defining an annular eductor space 404, 406. Additionally or in the alternative, a Coanda surface may be located at an interior surface of the motive fluid annulus preceding an annular eductor mouth 408, 410, or at an exterior surface of the motive fluid annulus downstream from an annular eductor mouth.

In some embodiments, motive fluid passes over a Coanda surface as fluid is ejected from an annular eductor space 404, 406 and out of an annular eductor mouth 408, 410. The Coanda surface entrains and accelerates the motive fluid, and the motive fluid ejected from the annular eductor mouth 408, 410 entrains nearby suction fluid, thereby accelerating both the motive fluid and the entrained suction fluid. Suction fluid from the area nearby the concentric eductor space and/or annular eductor spaces (e.g., a peripheral region 414 of the suction fluid flow 112 or a core region 418 of the suction fluid flow 112) is thereby entrained and accelerated through the suction fluid pathway 306 and, by displacement, suction fluid from upstream and adjacent regions of the suction fluid pathway 306 are correspondingly entrained and accelerated through the suction fluid pathway 306.

As shown, a first Coanda surface 438 defines a transition from the interior surface of the motive fluid annulus to the outward-facing exterior surface 428 of the motive fluid annulus 420. Similarly, a second Coanda surface 440 defines a transition from the interior surface of the motive fluid annulus to the inward-facing exterior surface 430 of the motive fluid annulus 420. Also as shown, the first Coanda surface 438 defines at least a portion of the first annular eductor space 404, and the second Coanda surface 440 defines at least a portion of the second annular eductor space 406. The first annular eductor space 404 directs motive fluid to a first annular eductor mouth 408. The first annular eductor space 404 may be at least partly defined by an inward surface 434 of the annular eductor cap 432 and a first Coanda surface 438 proximal to a transition from an interior surface of the motive fluid annulus 420 to an outward-facing exterior surface 428 of the motive fluid annulus. Similarly, the second annular eductor space 406 directs motive fluid to a second annular eductor mouth 410. The second annular eductor space 406 may be at least partly defined by an inward surface 434 of the annular eductor cap 432 and a second Coanda surface 440 proximal to a transition from the interior surface of the motive fluid annulus 420 to an inward-facing exterior surface 430 of the motive fluid annulus.

Motive fluid exiting the concentric eductor space 400 or the annular eductor spaces 404, 406 interacts with aspects of the exterior surface of the motive fluid annulus, exhibiting a Coanda effect and following the contour of the exterior surface. The exterior surface of the motive fluid annulus defines a guiding surface downstream from the respective annular eductor mouths 408, 410. Additionally, the exterior surface of the motive fluid annulus may itself include a Coanda surface, positioned either upstream or downstream from a guiding surface. As shown, the outward-facing exterior surface 428 of the motive fluid annulus 420 defines a first motive flow Coanda surface 442 and a first motive flow guiding surface 444. Similarly, the inward-facing exterior surface 430 of the motive fluid annulus defines a second motive flow Coanda surface 446 and a second motive flow guiding surface 448.

Figure 5A:
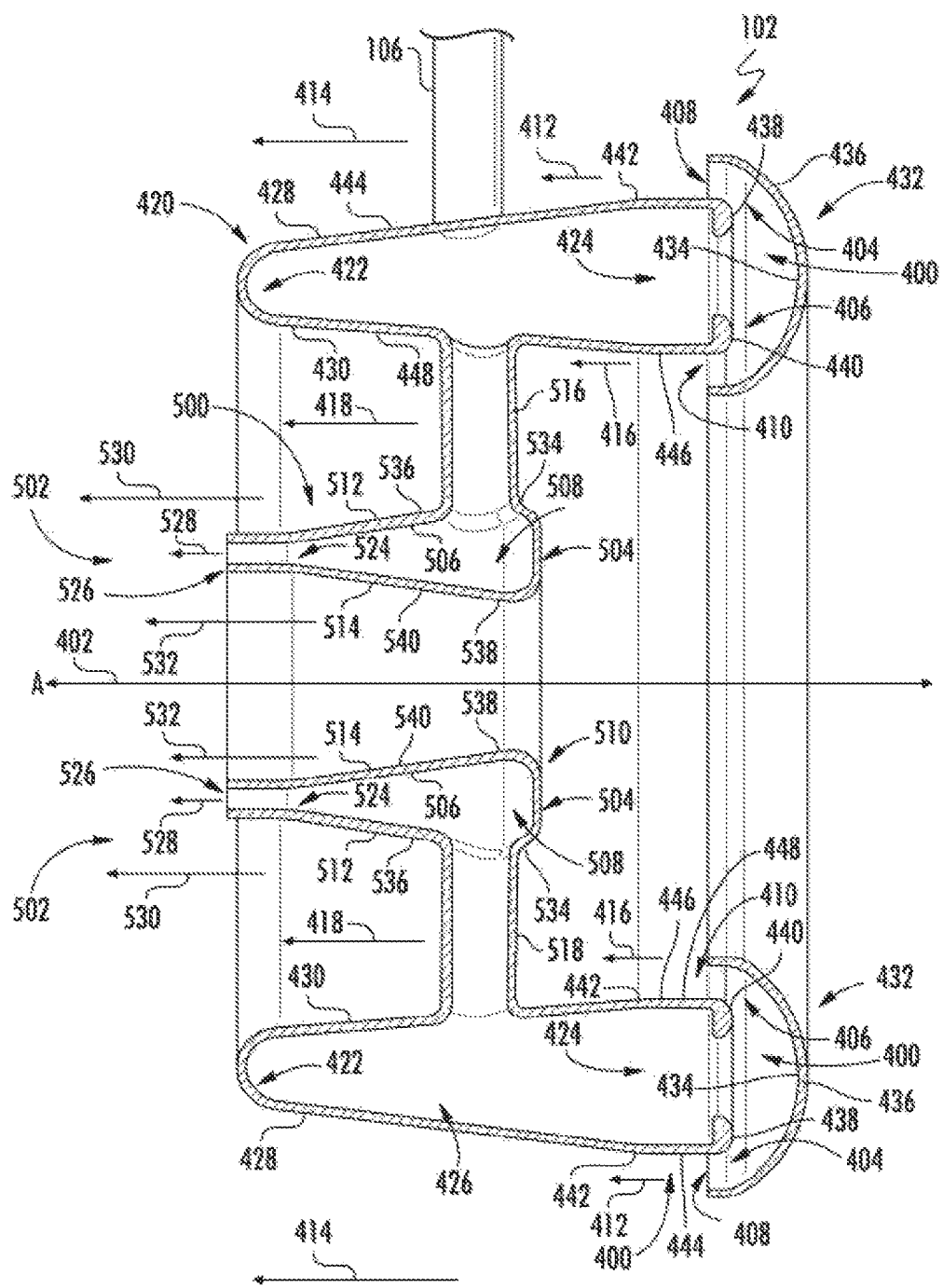
FIG. 5A is a cross-sectional perspective view of an exemplary eductor having a peripheral motive fluid annulus and a core motive fluid annulus.
Figure 5B:
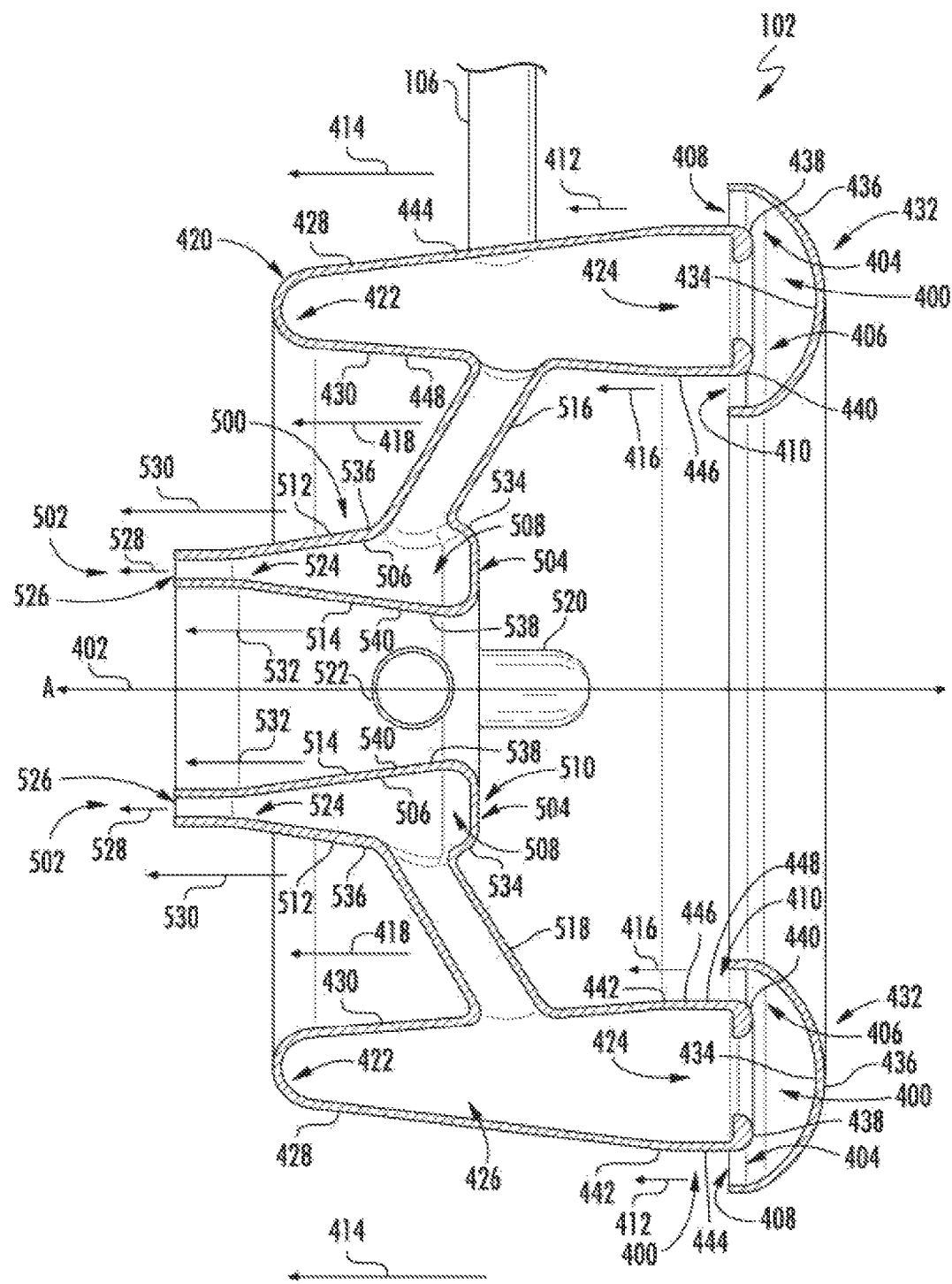
FIG. 5B is a cross-sectional perspective view of another exemplary eductor having a peripheral motive fluid annulus and a core motive fluid annulus.
Figure 6:
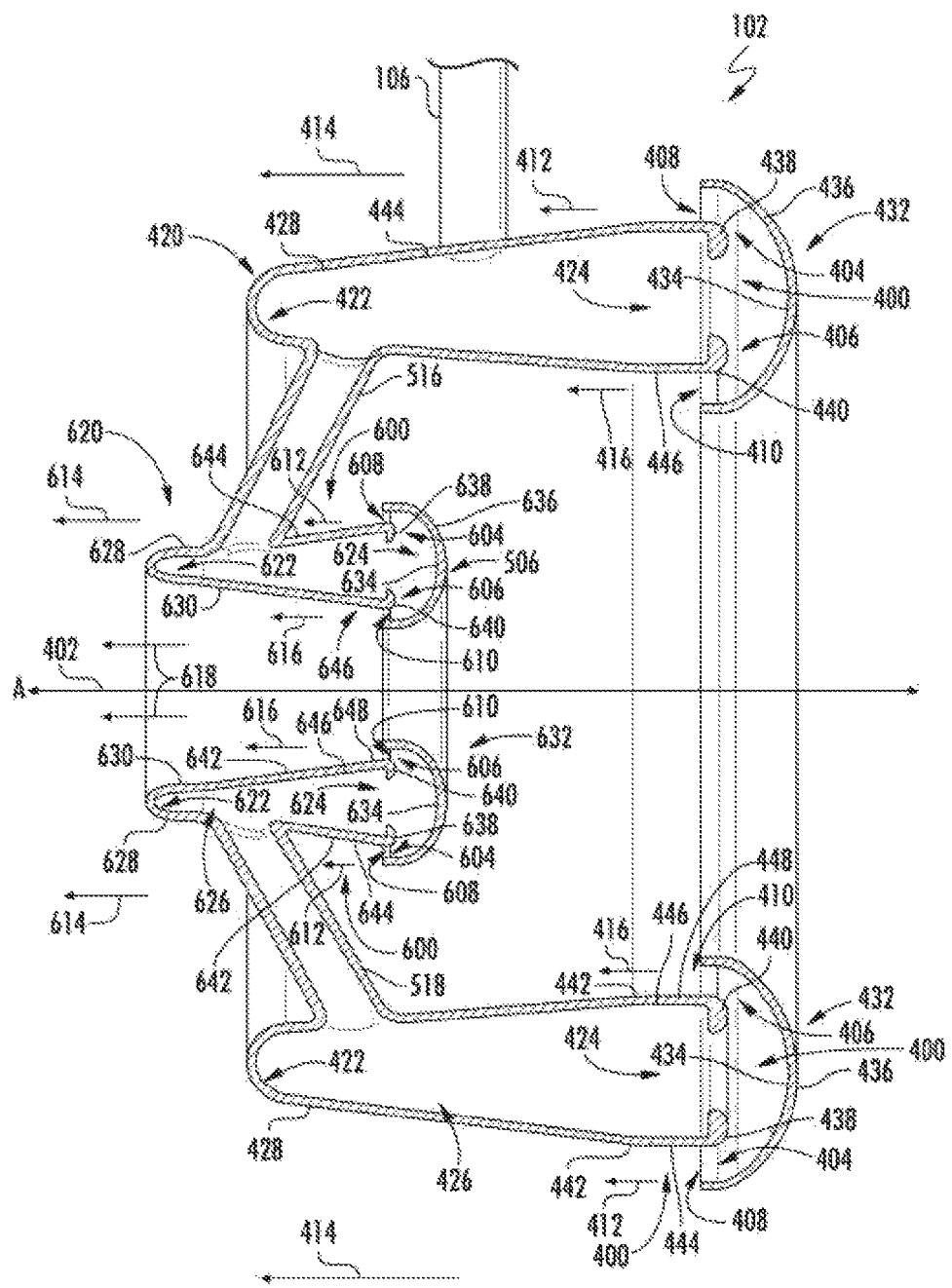
FIG. 6 is a cross-sectional perspective view of yet another exemplary eductor having a peripheral motive fluid annulus and a core motive fluid annulus.

Now turning to FIGS. 5A, 5B, and 6, in some embodiments, an eductor 102 may include a plurality of motive fluid annuli each configured to provide a concentric eductor space or one or more annular eductor spaces. A fluid eductor 102 that has a plurality of motive fluid annuli may include a first motive fluid annulus 420 and a second motive fluid annulus 500. For example, a first motive fluid annulus may supply motive fluid to a first concentric eductor space or one or more first annular eductor spaces, and a second motive fluid annulus may supply motive fluid to a second concentric eductor space or one or more second annular eductor spaces. Additionally, an eductor 102 may include three, four, or more motive fluid annuli. Each of the plurality of motive fluid annuli may be configured as described above. Alternatively, one or more of the plurality of motive fluid annuli may be configured differently from at least one other motive fluid annulus from the plurality. The plurality of motive fluid annuli may have a substantially concentric orientation relative to one another. A first motive fluid annulus 420 located about a periphery of a fluid eductor 102 is sometimes referred to a peripheral motive fluid annulus. A second motive fluid annulus 500 located about a core of a fluid eductor 102 is sometimes referred to as a core motive fluid annulus.

In an exemplary embodiment shown in FIGS. 5A and 5B, an exemplary fluid eductor 102 includes a peripheral motive fluid annulus 420 (i.e., a first motive fluid annulus) and a core motive fluid annulus 500 (i.e., a second motive fluid annulus) that has a substantially different configuration from the peripheral motive fluid annulus 420. The core motive fluid annulus 500 extends circumferentially about the axis 402. The core motive fluid annulus 500 has a substantially concentric orientation relative to a peripheral motive fluid annulus 420 (i.e., a first motive fluid annulus). The core motive annulus 500 has an open-end 502 and a closed-end 504. An interior surface 506 of the core motive fluid annulus 500 defines a core motive fluid delivery chamber 508. An exterior surface 510 of the core motive fluid annulus 500 includes an outward-facing exterior surface 512 and an inward-facing exterior surface 514. The outward-facing exterior surface 512 and the inward-facing exterior surface 514 have a substantially concentric orientation relative to one another.

One or more motive fluid distribution spokes 516, 518, 320, 522 extend between the peripheral motive fluid annulus 420 and the core motive fluid annulus 500, thereby coupling the peripheral motive fluid delivery chamber 426 to the core motive fluid delivery chamber 508. As shown, an exemplary embodiment may include two motive fluid distribution spokes 516, 518 (FIG. 5A) or four motive fluid delivery spokes 516, 518, 520, 522 (FIG. 5B). Alternatively, any other number of motive fluid delivery spokes may be provided. The motive fluid delivery spokes may have any desired configuration. For example, a motive fluid delivery spoke may have a cross-sectional profile that includes a substantially cylindrical, oval, curvilinear, or polyhedral cross-sectional profile, or any other desired cross-sectional profile.

The open-end 502 of the core motive fluid annulus 500 defines a core annular eductor space 524 (i.e., a third annular eductor space). The core annular eductor space 524 directs motive fluid to a core annular eductor mouth 526. The core annular eductor space is defined by the interior surface 506 of the open-end 502 of the core motive fluid annulus 500. The core annular eductor space 524 extends circumferentially about the axis 402, with a substantially concentric orientation relative to the concentric eductor space 400 or relative to the first annular eductor space 404 and/or the second annular eductor space 406 of the peripheral motive fluid annulus 420. In some embodiments, the core annular eductor space 524 is defined by at least a portion of the interior surface of the core motive fluid annulus 500 defining the core motive fluid delivery chamber 508. Motive fluid ejecting out of the core annular eductor mouth 526 provides a core annular jet 528, which entrains and accelerates a core region of the suction fluid flow 112. The core region includes an outer core region 530 located between the core motive fluid annulus and the peripheral motive fluid annulus, and an inner core region 532 located inward of the inward-facing exterior surface 514 of the core motive fluid annulus 500.

A fluid eductor 102 that has a plurality of motive fluid annuli may have any desirable arrangement or configuration as between the respective motive fluid annuli. For example, the upstream and downstream ends of the respective motive fluid annuli may be substantially aligned or substantially offset along the axis 402 in various combinations. As shown in FIG. 5A, the downstream ends of the peripheral motive fluid annulus 420 and the core motive fluid annulus 500 may be substantially aligned along the axis 402, and the upstream end of the core motive fluid annulus 500 may be substantially inset along the axis 402 from the upstream end of the peripheral motive fluid annulus 420. For example, the core annular eductor space 524 and/or the core annular eductor mouth 526 substantially aligns along the axis 402 with the closed-end 422 of the peripheral motive fluid annulus 420. This substantial alignment includes the core annular eductor mouth 526 extending along the axis 402 slightly past the closed-end 422 of the peripheral motive fluid annulus 420 as shown in FIG. 5A. Alternatively, as shown in FIG. 5B, the open-end 502 of the core motive fluid annulus 500 may extend along the axis 402 substantially beyond the closed-end of the peripheral motive fluid annulus 420. This may include the core annular eductor space 524 and/or the core annular eductor mouth 526 extending beyond the closed-end 422 of the peripheral motive fluid annulus 420. The respective annular eductor spaces also may be positioned about the axis 402 with any desired configuration relative to one another.

The fluid distribution spokes 516, 518, 520, 522 may be oriented perpendicular to the axis 402 as shown in FIG. 5A, or oblique to the axis 402 as shown in FIG. 5B. In some embodiments, the fluid distribution spokes may be angled relative to the axis 402 so as to position the core motive fluid annulus 500 and/or the core annular eductor space 524 or core annular eductor mouth 526 at a point along the axis 402 relative to the peripheral motive fluid annulus 420 or relative to the concentric eductor space 400 or annular eductor spaces 404, 406. In some embodiments, extending the core annular eductor space 524 and/or the core annular eductor mouth 526 downstream along the axis 402 relative to the peripheral motive fluid annulus 420 provides for improved entrainment of suction fluid around the core region of the suction fluid flow 530, 532.

In some embodiments, the exterior surface of a core motive fluid annulus 500 may define a Coanda surface and/or a guiding surface. For example, as shown in FIGS. 5A and 5B, an outward-facing exterior surface 512 of the core motive fluid annulus 500 defines a first secondary flow Coanda surface 534 and a first secondary flow guiding surface 536. Additionally, an inward-facing exterior surface 514 of the core motive fluid annulus defines a second secondary flow Coanda surface 538 and a second secondary flow guiding surface 540.

In an exemplary embodiment shown in FIG. 6, an exemplary fluid eductor 102 includes a peripheral motive fluid annulus 420 (i.e., a first motive fluid annulus) and a core motive fluid annulus 620 (i.e., a second motive fluid annulus) that has a substantially similar configuration as the peripheral motive fluid annulus 420. The core motive fluid annulus 620 extends circumferentially about the axis 402. The core motive fluid annulus 620 has a substantially concentric orientation relative to a peripheral motive fluid annulus 420 (i.e., a first motive fluid annulus). The core motive annulus 620 has a substantially similar configuration to the peripheral motive fluid annulus as described above with respect to FIGS. 4A and 4B. One or more motive fluid distribution spokes 516, 518 extend between the peripheral motive fluid annulus 420 and the core motive fluid annulus 620. Any number of motive fluid delivery spokes may be provided. The motive fluid delivery spokes may have any desired configuration. For example, a motive fluid delivery spoke may have a cross-sectional profile that includes a substantially cylindrical, oval, curvilinear, or polyhedral cross-sectional profile, or any other desired cross-sectional profile.

In the exemplary embodiment shown in FIG. 6, an exemplary fluid eductor 102 includes a peripheral concentric eductor space 400 and a core concentric eductor space 600. The core concentric eductor space 600 includes a plurality of annular eductor spaces extending circumferentially about the axis 402 with a substantially concentric orientation relative to one another. In some embodiments, the core concentric eductor space 600 may include a first core annular eductor space 604 and a second core annular eductor space 606. The first core annular eductor space 604 and the second core annular eductor space 606 may have a substantially concentric orientation relative to one another. The first core annular eductor space 604 directs motive fluid to a first core annular eductor mouth 608, and the second core annular eductor space 606 directs motive fluid to a second core annular eductor mouth 610. Motive fluid ejecting out of the first core annular eductor mouth 608 provides a first core annular jet 612, which entrains and accelerates a peripheral core region 614 of the suction fluid flow 112. Motive fluid ejecting out of the second core annular eductor mouth 610 provides a second core annular jet 616, which entrains and accelerates an inner core region 618 of the suction fluid flow 112.

Motive fluid from one or more motive fluid distribution spokes 516, 518 is distributed to the core concentric eductor space 600 by way of a core motive fluid annulus 620. The core motive fluid annulus 620 extends circumferentially about the axis 402. The core motive fluid annulus 620 may have any desired annular configuration. For example, a core motive fluid annulus 620 may have a substantially u-shaped, v-shaped, or airfoil-shaped cross-sectional profile. Other cross-sectional profiles also may be provided, including substantially cylindrical, oval, curvilinear, polyhedral, or any other desired cross-sectional profile.

In some embodiments, a core motive fluid annulus 620 includes a closed-end 622, and an open-end 624 leading to the core concentric eductor space 600 or the plurality of core annular eductor spaces. An interior surface of the core motive fluid annulus 620 defines a core motive fluid delivery chamber 626. An exterior surface of the core motive fluid annulus 620 includes an outward-facing exterior surface 628 and an inward-facing exterior surface 630. The outward-facing exterior surface 628 and the inward-facing exterior surface 630 have a substantially concentric orientation relative to one another.

The exemplary eductor 102 shown in FIG. 6 includes a core annular eductor cap 632 connected to the core motive fluid annulus 620 by a series of core eductor posts similar to those shown in FIG. 4B. The core annular eductor cap 632 and the core motive fluid annulus 620 may be integrally connected to one another or otherwise fastened together by the core eductor posts. The core annular eductor cap 632 directs motive fluid to the first core annular eductor space 604 and to the second core annular eductor space 606. The motive fluid may then be ejected out of the first core annular eductor mouth 608 and the second core annular eductor mouth 610. The dimensions and configuration of the core eductor posts may be selected to define the dimensions and configuration of the first core annular eductor mouth 608 and/or the second core annular eductor mouth 610. The core eductor posts may be airfoil-shaped (e.g., symmetric NACA series airfoil-shaped) to reduce interference with the motive fluid ejecting out of the first core annular eductor mouth 608 and the second core annular eductor mouth 610, and/or to optimize the characteristics of the first core annular jet 612 and the second core annular jet 616. In some embodiments, the core eductor posts may be configured to impart a swirling action to the first core annular jet 612 and the second core annular jet 616.

The core annular eductor cap 632 has an interior surface 634 and an exterior surface 636. The core annular eductor cap 632 extends circumferentially about the axis 402 and concentrically envelops the open-end 624 of the core motive fluid annulus 620. A core annular eductor cap 632 may have any desired annular configuration. For example, a core annular eductor cap may have a substantially semicircular, u-shaped, v-shaped, or airfoil-shaped cross-sectional profile. Other cross-sectional profiles also may be provided, including substantially cylindrical, oval, curvilinear, polyhedral, or any other desired cross-sectional profile. As shown, the core annular eductor cap 632 defines a substantially semicircular annulus such that at least a portion of the interior surface 634 of the annular eductor cap 632 concentrically envelops the open-end 624 of the core motive fluid annulus 620.

Various aspects of the core annular eductor cap 632 and the core motive fluid annulus 620 define the core concentric eductor space and/or a plurality of core annular eductor spaces. For example, aspects of the interior surface 634 of the core annular eductor cap 632 and aspects of the exterior surface 628, 630 of the core motive fluid annulus 620 may together define a core annular eductor space, and/or aspects of the interior surface 634 of the core annular eductor cap 632 and aspects of a transition region from the interior surface to the exterior surface of the core motive fluid annulus may together define a core annular eductor space. In some embodiments, the interior surface 634 of the core annular eductor cap 632 and a portion of the outward-facing exterior surface 628 of the core motive fluid annulus 620 together define the first core annular eductor space 604. Similarly, in some embodiments the interior surface 634 of the core annular eductor cap 632 and a portion of the inward-facing exterior surface 630 of the core motive fluid annulus 620 together define the second core annular eductor space 606.

In some embodiments, one or more Coanda surfaces may be provided at various locations about the interior or exterior of the core motive fluid annulus 620 and/or at various locations about the core annular eductor cap 632. A Coanda surface may be provided proximal to a transition from an interior surface of the core motive fluid annulus 620 to an outward-facing exterior surface of the core motive fluid annulus 620. A Coanda surface may define at least a portion of a core annular eductor space 604, 606, and/or at least a portion of a core annular eductor mouth 608, 610. Additionally or in the alternative, a Coanda surface may define a transition from the interior surface to the exterior surface of the core motive fluid annulus 620 and may extend beyond the exit of a core annular eductor mouth 608, 610. For example, a Coanda surface may be provided at an interior surface of the core motive fluid annulus 620, and/or at an interior surface 634 of the core annular eductor cap 632, such as at a portion thereof defining a core annular eductor space 604, 606. Additionally or in the alternative, a Coanda surface may be located at an interior surface of the core motive fluid annulus 620 preceding a core annular eductor mouth 608, 610, or at an exterior surface of the core motive fluid annulus downstream from a core annular eductor mouth.

As shown, a first core Coanda surface 638 defines a transition from the interior surface of the core motive fluid annulus to the outward-facing exterior surface 628 of the core motive fluid annulus 620. Similarly, a second core Coanda surface 640 defines a transition from the interior surface of the core motive fluid annulus to the inward-facing exterior surface 630 of the core motive fluid annulus 620. Also as shown, the first core Coanda surface 638 defines at least a portion of the first core annular eductor space 604, and the second core Coanda surface 640 defines at least a portion of the second core annular eductor space 606. The first core annular eductor space 604 directs motive fluid to a first core annular eductor mouth 608. The first core annular eductor space 604 may be at least partly defined by an inward surface 634 of the core annular eductor cap 632 and a first core Coanda surface 638 proximal to a transition from an interior surface of the core motive fluid annulus 620 to an outward-facing exterior surface 628 of the core motive fluid annulus 620. Similarly, the second core annular eductor space 606 directs motive fluid to a second core annular eductor mouth 610. The second core annular eductor space 606 may be at least partly defined by an inward surface 634 of the core annular eductor cap 632 and a second core Coanda surface 640 proximal to a transition from the interior surface of the core motive fluid annulus 620 to an inward-facing exterior surface 630 of the core motive fluid annulus 620.

Motive fluid exiting the core concentric eductor space 600 or the core annular eductor spaces 604, 606 interacts with aspects of the exterior surface of the core motive fluid annulus 620, exhibiting a Coanda effect and following the contour of the exterior surface. The exterior surface of the core motive fluid annulus defines a guiding surface downstream from the respective core annular eductor mouths 608, 610. Additionally, the exterior surface of the core motive fluid annulus may itself include a Coanda surface, positioned either upstream or downstream from a guiding surface. As shown, the outward-facing exterior surface 628 of the core motive fluid annulus 620 defines a first core motive flow Coanda surface 642 and a first core motive flow guiding surface 644. Similarly, the inward-facing exterior surface 630 of the core motive fluid annulus defines a second core motive flow Coanda surface 646 and a second core motive flow guiding surface 648.

A fluid eductor 102 that has a plurality of motive fluid annuli may have any desirable arrangement or configuration as between the respective motive fluid annuli. For example, the upstream and downstream ends of the respective motive fluid annuli may be substantially aligned or substantially offset along the axis 402 in various combinations. As shown in FIG. 6, the closed-end 622 of the core motive fluid annulus 620 may extend along the axis 402 substantially beyond the closed-end 422 of the peripheral motive fluid annulus 420. Additionally, the upstream end of the core motive fluid annulus 620 may be substantially inset along the axis 402 from the upstream end of the peripheral motive fluid annulus 420. This may include the first core annular eductor space 604 and the second core annular eductor space 606 extending beyond the first annular eductor space 404 and the second annular eductor space 406 of the peripheral motive fluid annulus 420, and/or the first core annular eductor mouth 608 and the second core annular eductor mouth 610 extending beyond the first annular eductor mouth 408 and the second annular eductor mouth 410 of the peripheral motive fluid annulus 420. Alternatively, the downstream ends of the peripheral motive fluid annulus 420 and the core motive fluid annulus 620 may be substantially aligned along the axis 402, For example, the first core annular eductor space 604 and the second core annular eductor space 606 may substantially align with the first annular eductor space 404 and the second annular eductor space 406 of the peripheral motive fluid annulus 420, and/or the first core annular eductor mouth 608 and the second core annular eductor mouth 610 may substantially align with the first annular eductor mouth 408 and the second annular eductor mouth 410 of the peripheral motive fluid annulus 420. The respective annular eductor spaces also may be positioned about the axis with any desired configuration relative to one another.

The fluid distribution spokes 516, 518 may be oriented perpendicular to the axis 402, or oblique to the axis 402 as shown in FIG. 6. In some embodiments, the fluid distribution spokes may be angled relative to the axis 402 so as to position the core concentric eductor space 600 (or the first core annular eductor space 604 and the second core annular eductor space 606, and/or the first core annular eductor mouth 608 and the second core annular eductor mouth 610) at a point along the axis 402 relative to the peripheral motive fluid annulus 420 or relative to the peripheral concentric eductor space 400 or peripheral annular eductor spaces 404, 406. In some embodiments, extending the core annular eductor space 600 and/or the core annular eductor mouths 608, 610 downstream along the axis 402 relative to the peripheral motive fluid annulus 420 provides for improved entrainment of suction fluid around the core region of the suction fluid flow 112.

Dimensions of a fluid eductor 102 may be characterized relative to the dimensions of the suction fluid pathway 306 adjacent to the fluid eductor. A fluid eductor 102 may have a diameter that is between about 10% to 90% of the internal diameter or cross-sectional width of the suction fluid pathway. As examples, the diameter of a fluid eductor may be a percentage of the internal diameter or cross-sectional width of the suction fluid pathway of between about 10% to 25%, 25% to 50%, 50% to 75%, or 75% to 90%.

Dimensions and configurations of a plurality of motive fluid annuli 420, 500 of a fluid eductor 102 may be characterized relative to one another. A fluid eductor 102 that has a first motive fluid annulus 420 and a second motive fluid annulus 500 may be configured such that the external diameter of the second motive fluid annulus 500 is a percentage of the external diameter of the first motive fluid annulus 420. The external diameter of the second motive fluid annulus 500 may be a percentage of the external diameter of the first motive fluid annulus 420 between about 20% to 80%, such as between about 20% to 35%, about 35% to 50%, about 50% to 65%, or about 65% to 80%.

Referring now to FIGS. 7A and 7B, in some embodiments a fluid eductor 102 may include one or more features with a spiral configuration. For example, a spiral configuration may be imparted to a motive fluid annulus 420, a corresponding annular eductor cap 432, and/or to a concentric eductor space 400 or annular eductor spaces 404, 406. Similarly, a spiral configuration may be imparted to a core motive fluid annulus 500, 620, a corresponding core annular eductor cap 632, and/or a core concentric eductor space 600 or core annular eductor spaces 604, 606. These features may extend circumferentially about the axis 402 with a spiral configuration 700 and/or longitudinally along the axis 402 with a spiral configuration 700. A fluid eductor 102 with a spiral configuration 700 may otherwise be configured as described herein, including as described with reference to FIGS. 4A-6. For example, with a substantially spiral configuration 700, a spiral concentric eductor space 702 includes a first spiral annular eductor space 704 and a second spiral annular eductor space 706. The first spiral annular eductor space 704 directs motive fluid to a first spiral annular eductor mouth 708, and the second spiral annular eductor space 706 directs motive fluid to a second spiral annular eductor mouth 710. Motive fluid ejecting out of the first spiral annular eductor mouth 708 provides a first spiral annular jet 712 which entrains and accelerates a peripheral spiral region 714 of the suction fluid flow 112. Motive fluid ejecting out of the second spiral annular eductor mouth 710 provides a second spiral annular jet 716, which entrains and accelerates a core spiral region 718 of the suction fluid flow 112. In some embodiments, the fluid eductor 102 shown in FIGS. 4A-6 may have a spiral configuration 700.

Figure 8A:
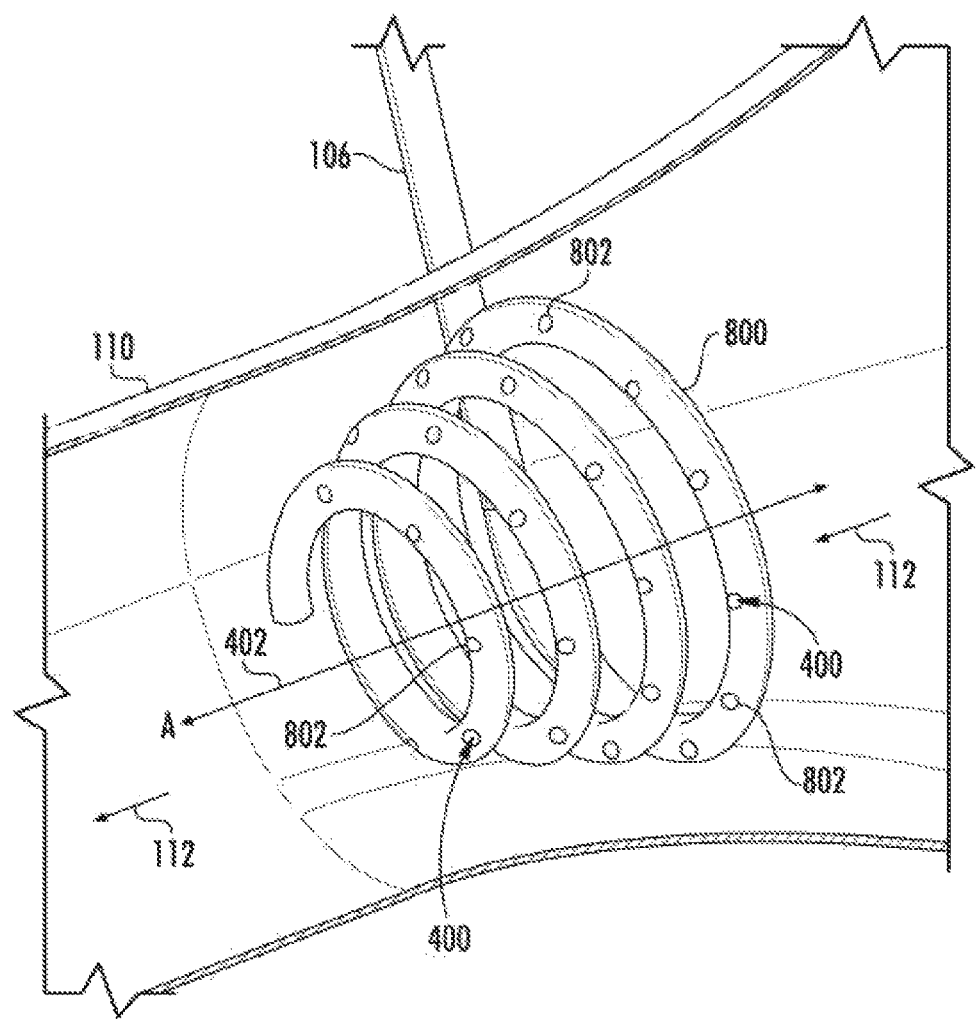
FIG. 8A is a partial cutaway perspective view of an exemplary fluid eductor with a spiral perforated motive fluid tube.
Figure 8B:
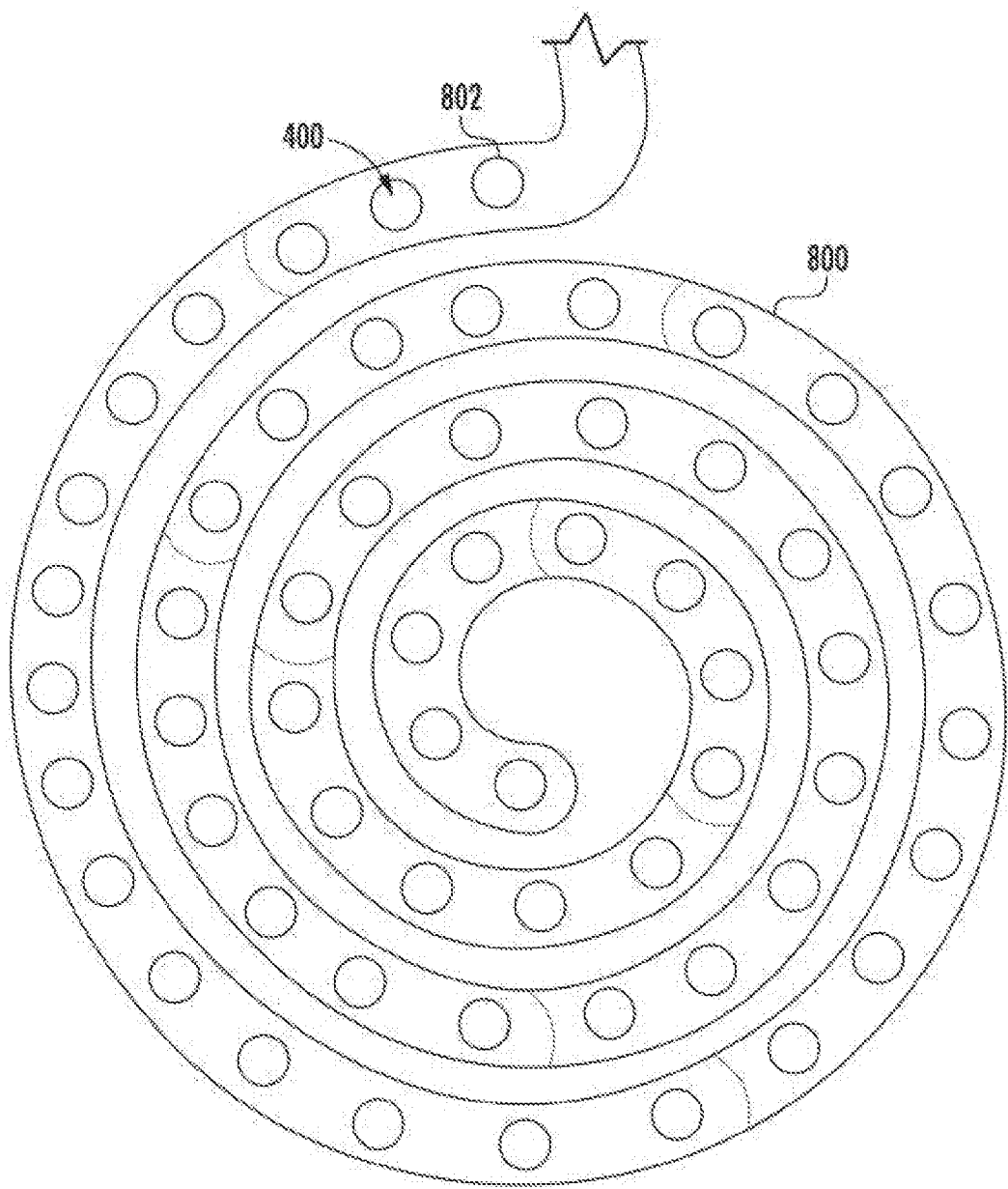
FIG. 8B is an upstream perspective view of the exemplary fluid eductor of FIG. 8A.

Referring now to FIGS. 8A and 8B, in some embodiments a fluid eductor 102 may include a perforated motive fluid tube 800. The perforated motive fluid tube 800 may extend circumferentially about and/or along the axis 402 with a spiral configuration. The perforated motive fluid tube 800 includes a plurality of perforations or holes 802. As shown in FIG. 8B, the perforations or holes 802 may at least partially face downstream. Alternatively, or in addition, at least a portion of the perforations or holes 802 may face radially or upstream. The exterior surface of the perforated motive fluid tube may define a Coanda surface. Motive fluid ejected from the perforations or holes 802 may entrain and accelerate a region of the suction fluid flow 112.

Figure 9:
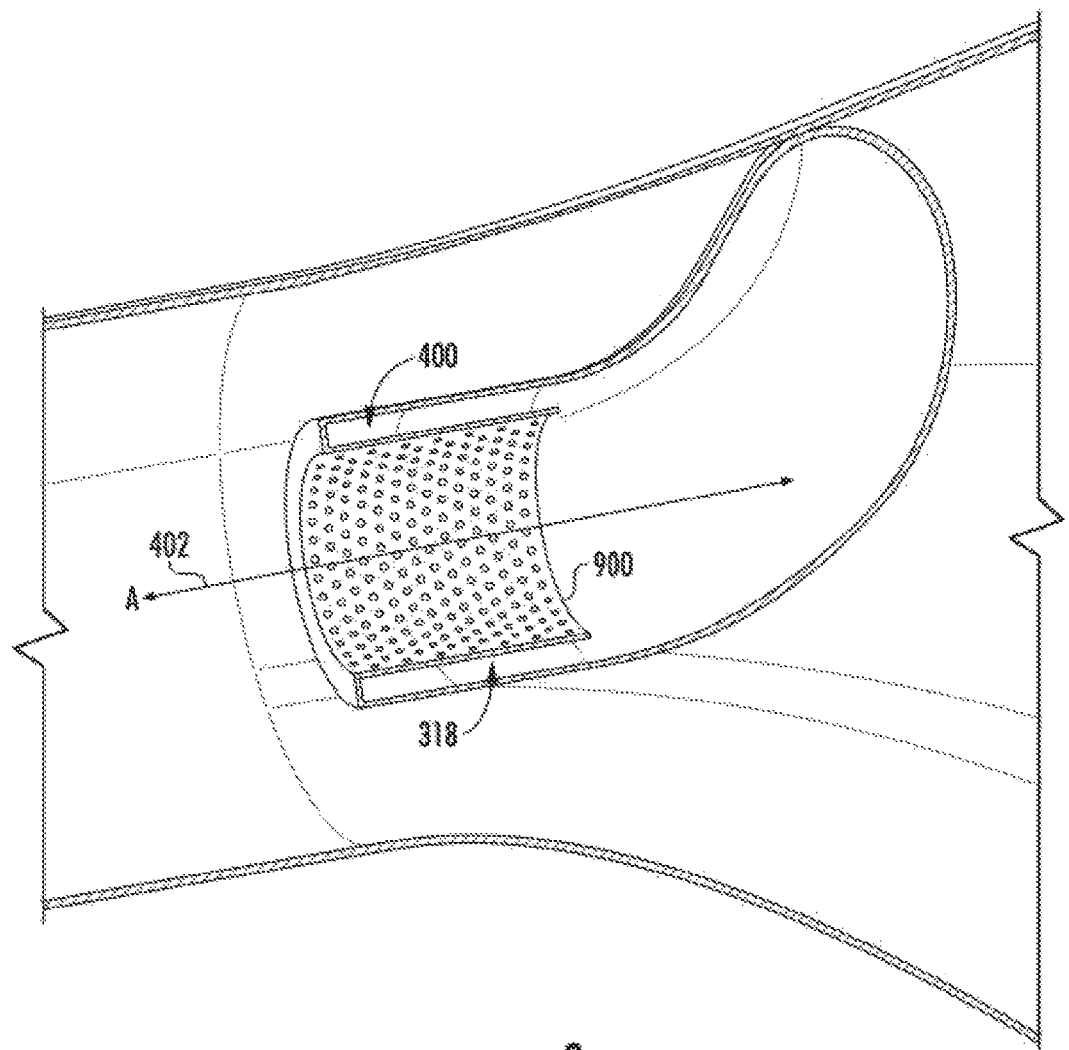
FIG. 9 is a cross-sectional perspective view of an exemplary fluid eductor with a perforated discharge plate.

Referring now to FIG. 9, in some embodiments a fluid eductor 102 may include a perforated sheet 900 disposed about a concentric eductor space 400. In some embodiments, the perforated sheet 900 may provide higher static pressure in the motive fluid upstream of the perforated sheet 900, thereby providing motive fluid with greater velocity, which in some embodiments may improve entrainment of suction fluid.

The presently disclosed fluid eductors can be manufactured using any desired manufacturing process, including machining, forging, casting, injection molding, electroforming, coldspray, and/or additive manufacturing processes. Such an "additive manufacturing" process includes any process which results in a three-dimensional (3D) object and includes a step of sequentially forming the shape of the object one layer at a time. Additive manufacturing processes include, for example, 3D printing, laser-net-shape manufacturing, direct laser sintering, direct laser melting, selective laser sintering (SLS), plasma transferred arc, freeform fabrication, stereolithography (SLA), and the like. Additive manufacturing processes can employ liquid materials, solid materials, powder materials, or wire as a raw material. Moreover, additive manufacturing processes can generally relate to a rapid way to manufacture an object (article, component, part, product, etc.) where a plurality of thin unit layers are sequentially formed to produce the object. For example, layers of a liquid material may be provided (e.g., laid down) and irradiated with an energy beam (e.g., laser beam) so that each layer are sequentially cured to solidify the layer.

Figure 10:
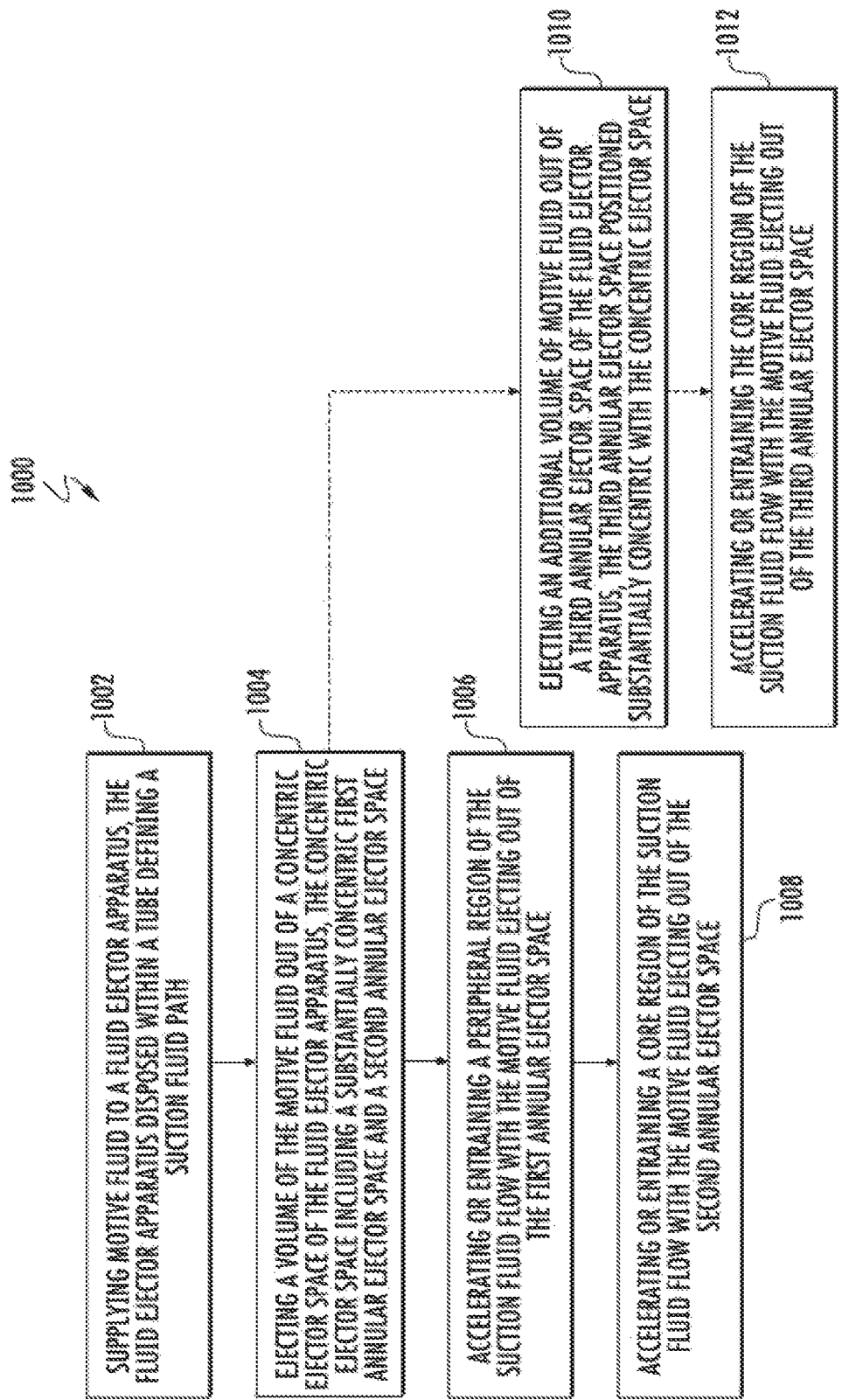
FIG. 10 is a flow chart depicting an exemplary method of entraining a suction fluid flow using an fluid eductor configured in accordance with one embodiment.
Figure 11A:
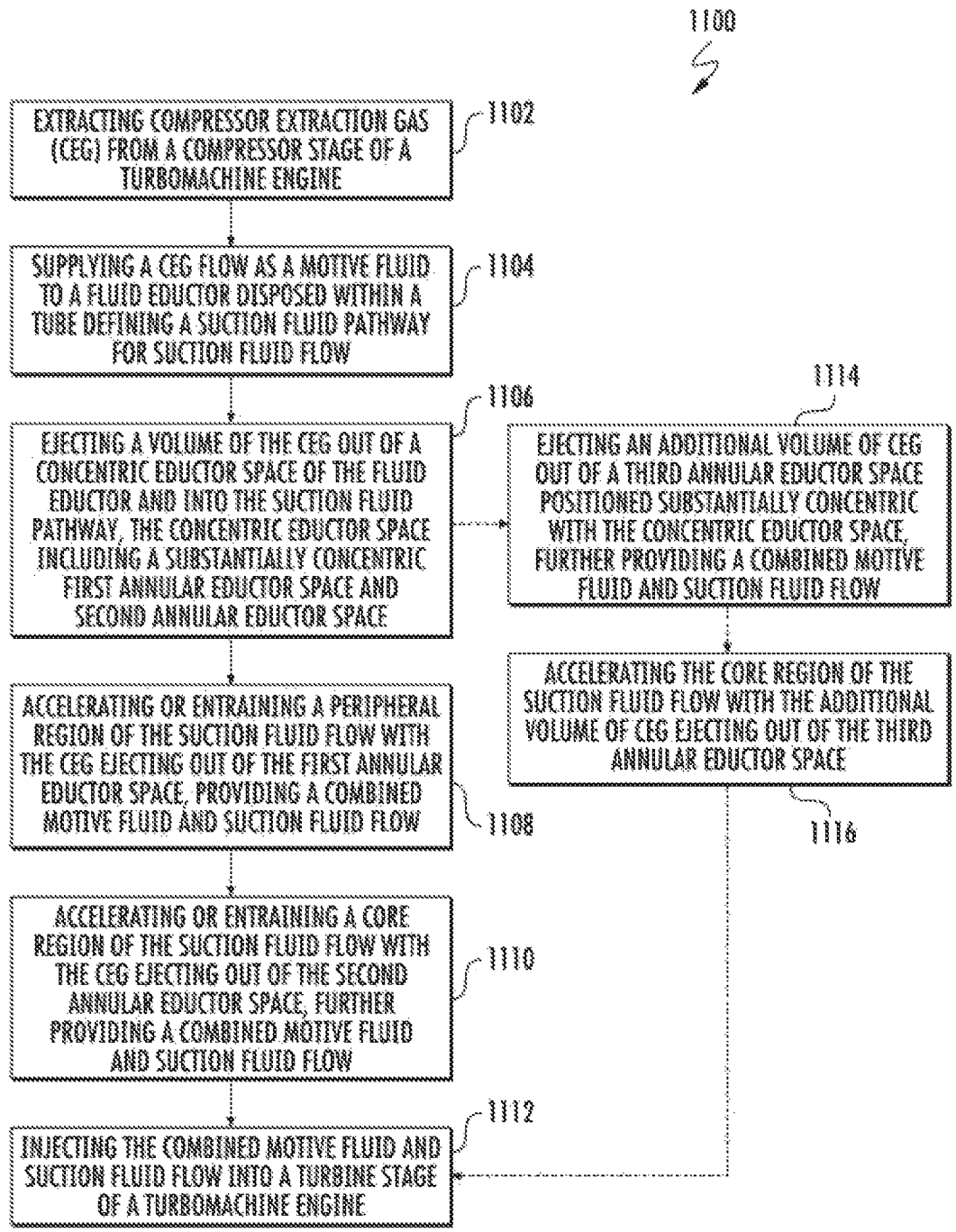
FIG. 11A is a flow chart depicting an exemplary method of cooling a turbomachine engine using a fluid eductor system.
Figure 11B:
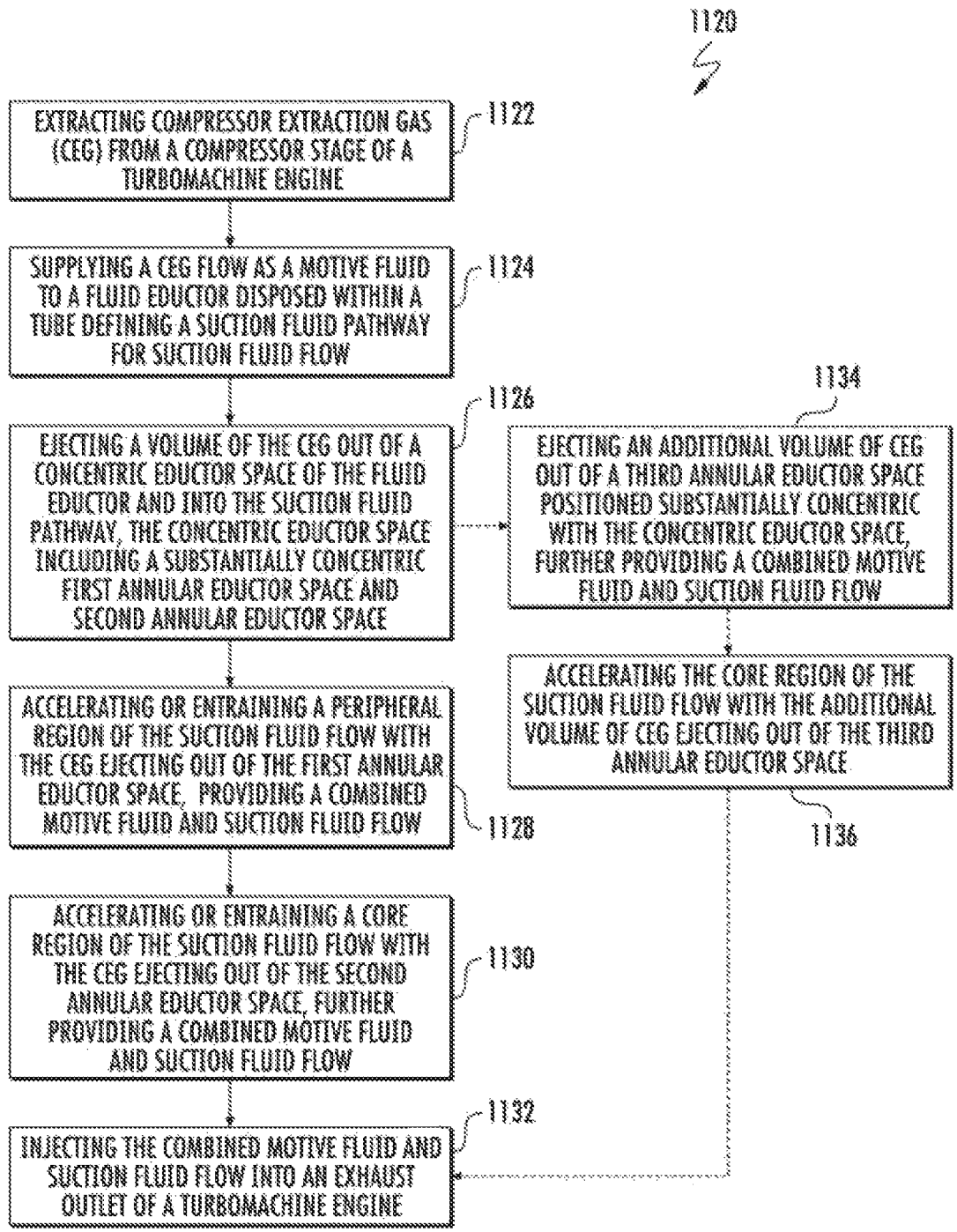
FIG. 11B is a flow chart depicting an exemplary method of purging exhaust gasses from a turbomachine engine using a fluid eductor system.
Figure 11C:
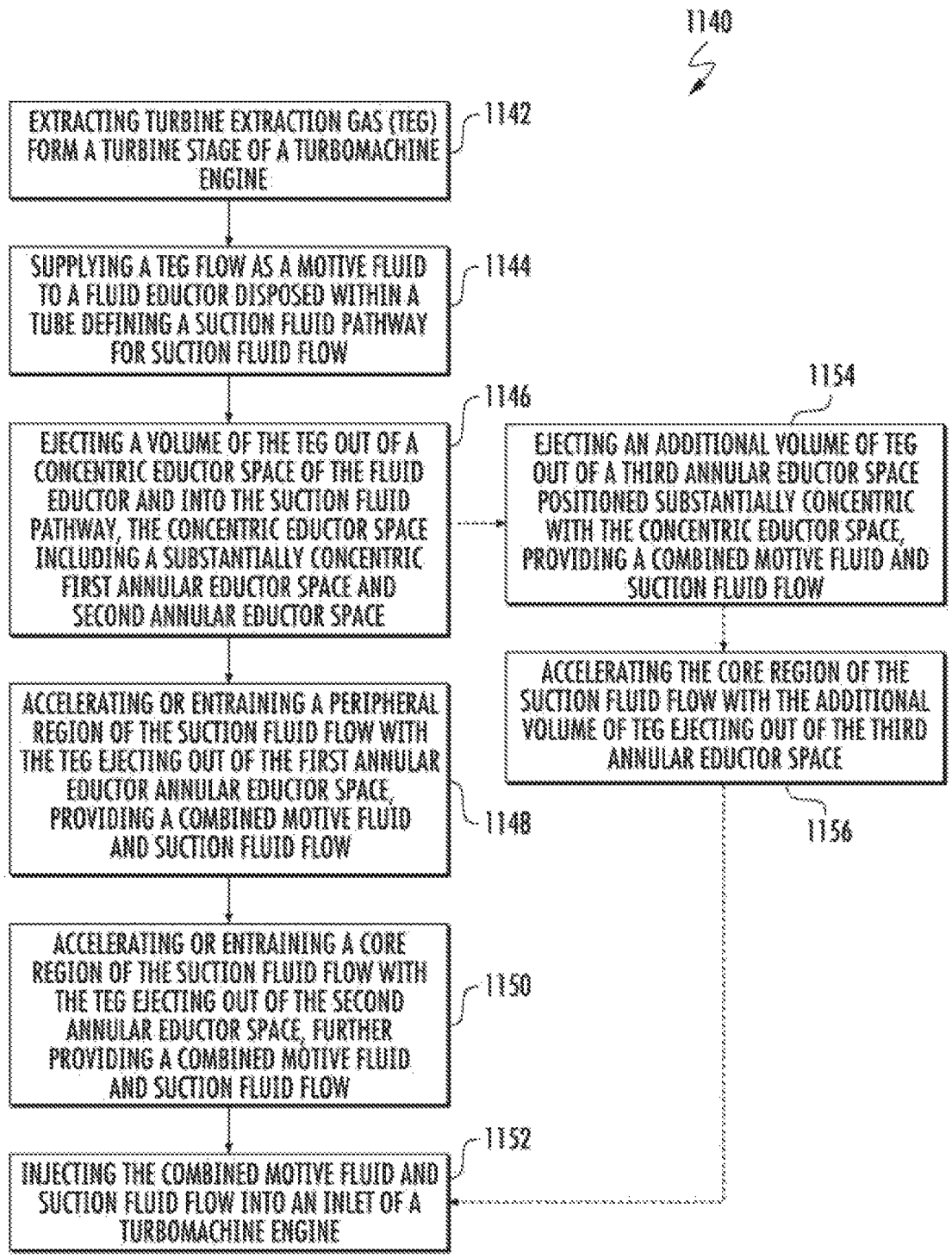
FIG. 11C is a flow chart depicting an exemplary method of heating a compressor inlet flow to a turbomachine engine using a fluid eductor system.

Referring now to FIG. 10, an exemplary method 1000 of entraining a suction fluid flow using a fluid eductor 102 will be described. The fluid eductor 102 used in the exemplary method 1000 may be configured according to the present disclosure, and may include any of the features described herein or combinations thereof. The exemplary method 1000 includes supplying motive fluid to a fluid eductor disposed within a tube defining a suction fluid pathway 1002, and ejecting a volume of motive fluid out of a concentric eductor space of the fluid eductor 1004. The concentric eductor space may include a substantially concentric first annular eductor space and second annular eductor space as described herein. The method proceeds with accelerating or entraining a peripheral region of the suction fluid flow with the motive fluid ejecting out of the first annular eductor space 1006, and accelerating or entraining a core region of the suction fluid flow with the motive fluid ejecting out of the second annular eductor space 1008. In some embodiments, the exemplary method 1000 further includes ejecting an additional volume of motive fluid out of a third annular eductor space positioned substantially concentric with the concentric eductor space 1010, and accelerating the core region of the suction fluid flow with the motive fluid ejecting out of the third annular eductor space 1012. In some embodiments, the entrained suction fluid flow may be used in a turbomachine engine system as described herein. In some embodiments, the suction fluid flow may be a cooling fluid in a heat exchange system. The heat exchange system may be used to cool oil from a turbomachine engine. For example, the suction fluid may include ambient air or an inert gas. Referring now to FIGS. 11A-11C, exemplary methods will now be described for cooling a turbomachine engine 200 using a fluid eductor system 100 (FIG. 11A), purging exhaust gas from a turbomachine engine 200 using a fluid eductor system 100 (FIG. 11B), and heating a compressor inlet flow to a turbomachine engine using a fluid eductor system 100 (FIG. 11C).

FIG. 11A shows an exemplary method 1100 of cooling a turbomachine engine using a fluid eductor system 100. The fluid eductor 102 used in the exemplary method 1100 may be configured according to the present disclosure, and may include any of the features described herein or combinations thereof. The exemplary method 1100 begins with extracting compressor extraction gas (CEG) from a compressor stage of a turbomachine engine 1102. The method continues with supplying a CEG flow as a motive fluid to a fluid eductor disposed within a tube defining a suction fluid pathway for suction fluid flow 1104, and ejecting a volume of the CEG out of a concentric eductor space of the fluid eductor and into the suction fluid pathway 1106. The concentric eductor space may include a substantially concentric first annular eductor space and second annular eductor space as described herein. The suction fluid may include an external flow 220 and/or a CEG flow 224 (e.g., see FIG. 2). The method 1100 proceeds with accelerating or entraining a peripheral region of the suction fluid flow with the CEG ejecting out of the first annular eductor space 1108, and accelerating or entraining a core region of the suction fluid flow with the CEG ejecting out of the second annular eductor space 1110, together providing a combined motive fluid and suction fluid flow. The method 1100 proceeds with injecting the combined fluid flow into a turbine stage of a turbomachine engine 1112.

In some embodiments, the exemplary method 1100 further includes ejecting an additional volume of CEG out of a third annular eductor space positioned substantially concentric with the concentric eductor space 1114, and accelerating the core region of the suction fluid flow with the additional volume of CEG ejecting out of the third annular eductor space 1116. The third annular eductor space may be part of a core concentric eductor space that includes the third annular eductor space and a fourth annular eductor space.

FIG. 11B shows an exemplary method 1120 of purging exhaust gas from a turbomachine engine using a fluid eductor system 100. The fluid eductor 102 used in the exemplary method 1120 may be configured according to the present disclosure, and may include any of the features described herein or combinations thereof. The exemplary method 1120 begins with extracting compressor extraction gas (CEG) from a compressor stage of a turbomachine engine 1122. The method continues with supplying a CEG flow as a motive fluid to a fluid eductor disposed within a tube defining a suction fluid pathway for suction fluid flow 1124, and ejecting a volume of the CEG out of a concentric eductor space of the fluid eductor and into the suction fluid pathway 1126. The concentric eductor space may include a substantially concentric first annular eductor space and second annular eductor space as described herein. The suction fluid may include an external flow 220 and/or a CEG flow 224 (e.g., see FIG. 2). The method 1120 proceeds with accelerating or entraining a peripheral region of the suction fluid flow with the CEG ejecting out of the first annular eductor space 1128, and accelerating or entraining a core region of the suction fluid flow with the CEG ejecting out of the second annular eductor space 1130, together providing a combined motive fluid and suction fluid flow. The method 1120 proceeds with injecting the combined fluid flow into an exhaust outlet of a turbomachine engine 1132.

In some embodiments, the exemplary method 1120 further includes ejecting an additional volume of CEG out of a third annular eductor space positioned substantially concentric with the concentric eductor space 1124, and accelerating the core region of the suction fluid flow with the additional volume of CEG ejecting out of the third annular eductor space 1136. The third annular eductor space may be part of a core concentric eductor space that includes the third annular eductor space and a fourth annular eductor space.

FIG. 11C shows an exemplary method 1140 of heating a compressor inlet flow using a fluid eductor system 100. The fluid eductor 102 used in the exemplary method 1140 may be configured according to the present disclosure, and may include any of the features described herein or combinations thereof. The exemplary method 1140 begins with extracting turbine extraction gas (TEG) from a turbine stage of a turbomachine engine 1142. The method continues with supplying a TEG flow as a motive fluid to a fluid eductor disposed within a tube defining a suction fluid pathway for suction fluid flow 1144, and ejecting a volume of the TEG out of a concentric eductor space of the fluid eductor and into the suction fluid pathway 1146. The concentric eductor space may include a substantially concentric first annular eductor space and second annular eductor space as described herein. The suction fluid may include a turbine compartment airflow, an external flow 242, and/or a CEG flow 246 (e.g., see FIG. 2). The method 1140 proceeds with accelerating or entraining a peripheral region of the suction fluid flow with the TEG ejecting out of the first annular eductor space 1148, and accelerating or entraining a core region of the suction fluid flow with the TEG ejecting out of the second annular eductor space 1150, together providing a combined motive fluid and suction fluid flow. The method 1140 proceeds with injecting the combined fluid flow into a compressor inlet of a turbomachine engine 1152.

In some embodiments, the exemplary method 1140 further includes ejecting an additional volume of TEG out of a third annular eductor space positioned substantially concentric with the concentric eductor space 1154, and accelerating the core region of the suction fluid flow with the additional volume of TEG ejecting out of the third annular eductor space 1156. The third annular eductor space may be part of a core concentric eductor space that includes the third annular eductor space and a fourth annular eductor space.

Figure 12:
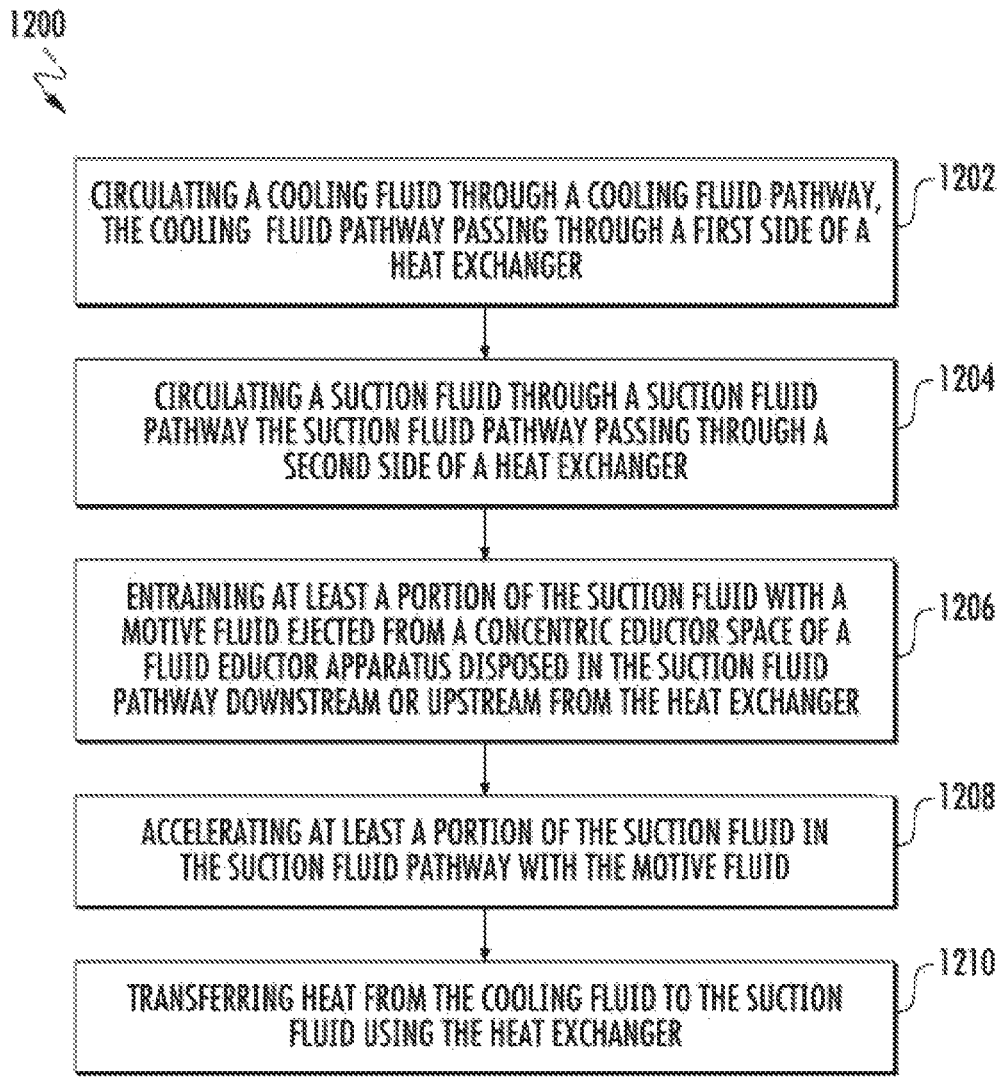
FIG. 12 is a flow chart depicting an exemplary method of exchanging heat between a cooling fluid and a second fluid in a heat exchange system using a fluid eductor system.

Referring now to FIG. 12, an exemplary method of exchanging heat between a cooling fluid and a second fluid in a heat exchange system will be described. The heat exchange system used in the exemplary method 1200 may be configured according to the present disclosure, and may include any of the features described herein or combinations thereof. The exemplary method 1200 includes circulating a cooling fluid through a cooling fluid pathway passing through a first side of the heat exchanger 1202 and circulating a suction fluid through a suction fluid pathway passing through a second side of the heat exchanger 1204. The cooling fluid pathway and the suction fluid pathway may be in thermal contact or close proximity, allowing heat from the cooling fluid to be passed to the suction fluid. The exemplary method 1200 continues with entraining at least a portion of the suction fluid with a motive fluid ejected from a concentric eductor space of a fluid eductor disposed in the suction fluid pathway downstream from the heat exchanger 1206, thereby accelerating at least a portion of the suction fluid in the suction fluid pathway with the motive fluid 1208. The suction fluid flow may be entrained as described above with reference to FIG. 10. The exemplary method 1200 continues with transferring heat from the cooling fluid to the second fluid, or vice versa, using the heat exchanger 1210. The transferring heat thereby cools the cooling fluid and heats the second fluid, or vice versa.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A fluid eductor comprising:
   a first motive fluid annulus extending circumferentially about an axis and having an open-end and a closed-end, an interior surface of the first motive fluid annulus defining a first motive fluid delivery chamber, and an exterior surface of the first motive fluid annulus comprising a concentric outward-facing exterior surface and inward-facing exterior surface;
   a first Coanda surface defining a transition from the interior surface of the first motive fluid annulus to the concentric outward-facing exterior surface of the first motive fluid annulus, or
   a second Coanda surface defining a transition from the interior surface of the first motive fluid annulus to the inward-facing exterior surface of the first motive fluid annulus; and
   an annular eductor cap connected to the first motive fluid annulus, the annular eductor cap extending circumferentially about the axis and defining a semicircular annulus, wherein at least a portion of an interior surface of the annular eductor cap concentrically envelops the open-end of the first motive fluid annulus; and
   wherein at least a portion of the interior surface of the annular eductor cap and the open-end of the first motive fluid annulus defines a concentric eductor space comprising a concentric first annular eductor space and second annular eductor space, the first annular eductor space defined at least in part by a portion of the interior surface of the annular eductor cap and a portion of the concentric outward-facing exterior surface of the first motive fluid annulus, and the second annular eductor space defined at least in part by the interior surface of the annular eductor cap and a portion of the inward-facing exterior surface of the first motive fluid annulus.

2. The fluid eductor of claim 1, further comprising:
   at least one motive fluid supply inlet positioned about the exterior surface of the first motive fluid annulus.

3. The fluid eductor of claim 1, wherein the fluid eductor comprises the first Coanda surface and the second Coanda surface.

4. The fluid eductor of claim 1, wherein the first Coanda surface defines at least a portion of the first annular eductor space, and wherein the second Coanda surface defines at least a portion of the second annular eductor space.

5. The fluid eductor of claim 1, wherein the concentric outward-facing exterior surface of the first motive fluid annulus defines a first motive flow Coanda surface and a first motive flow guiding surface, and wherein the inward-facing exterior surface of the first motive fluid annulus defines a second motive flow Coanda surface and a second motive flow guiding surface.

6. The fluid eductor of claim 1, further comprising:
   a second motive fluid annulus extending circumferentially about the axis and being concentric to the first motive fluid annulus, the second motive fluid annulus having an open-end and a closed-end, an interior surface of the second motive fluid annulus defining a second motive fluid delivery chamber, and an exterior surface of the second motive fluid annulus comprising a concentric outward-facing exterior surface and inward-facing exterior surface;
   at least one motive fluid distribution spoke operably coupling the first motive fluid delivery chamber to the second motive fluid delivery chamber; and
   a third annular eductor space defined at least in part by the interior surface of the open-end of the second motive fluid annulus, the third annular eductor space being concentric to the first annular eductor space and/or the second annular eductor space.

7. The fluid eductor of claim 6, wherein the open-end of the second motive fluid annulus extends along the axis beyond the closed-end of the first motive fluid annulus.

8. The fluid eductor of claim 6, wherein the concentric outward-facing exterior surface of the second motive fluid annulus defines a first secondary flow Coanda surface, and wherein the inward-facing exterior surface of the second motive fluid annulus defines a second secondary flow Coanda surface.

9. The fluid eductor of claim 1, wherein the fluid eductor is configured to eject a motive fluid out of the concentric eductor space, the motive fluid comprising ambient air or an inert gas.

10. The fluid eductor of claim 9, further comprising at least one motive fluid supply line operably coupled to the first motive fluid delivery chamber to supply the motive fluid to the first motive fluid delivery chamber.

11. The fluid eductor of claim 1, wherein the fluid eductor is disposed within a tube defining a suction fluid pathway.

12. The fluid eductor of claim 11, wherein the tube is positioned downstream from a heat exchanger, and wherein the fluid eductor is used to draw a cooling fluid within the suction fluid pathway through the heat exchanger to cool a stream of hot fluid.

13. The fluid eductor of claim 12, wherein the stream of hot fluid comprises oil from a turbomachine engine.

14. The fluid eductor of claim 12, wherein the heat exchanger comprises an air-cooled-oil-cooler, the hot fluid comprising oil and the cooling fluid comprising ambient air or an inert gas.

15. A heat transfer system, the heat transfer system comprising:
- a tube defining a suction fluid pathway and a heat exchanger defining a cooling fluid pathway and a portion of the suction fluid pathway, the heat exchanger arranged to exchange heat between a cooling fluid in the cooling fluid pathway and a suction fluid in the suction fluid pathway;
- a fluid eductor disposed within the suction fluid pathway downstream from the heat exchanger; and
- a motive fluid supply line operably coupled to the fluid eductor;
- wherein the fluid eductor comprises:
  - a first motive fluid annulus extending circumferentially about an axis and having an open-end and a closed-end, an interior surface of the first motive fluid annulus defining a first motive fluid delivery chamber, and an exterior surface of the first motive fluid annulus comprising a concentric outward-facing exterior surface and inward-facing exterior surface;
  - a first Coanda surface defining a transition from the interior surface of the first motive fluid annulus to the concentric outward-facing exterior surface of the first motive fluid annulus, or
  - a second Coanda surface defining a transition from the interior surface of the first motive fluid annulus to the inward-facing exterior surface of the first motive fluid annulus; and
  - an annular eductor cap connected to the first motive fluid annulus, the annular eductor cap extending circumferentially about the axis and defining a semicircular annulus, wherein at least a portion of an interior surface of the annular eductor cap concentrically envelops the open-end of the first motive fluid annulus; and
  - wherein at least a portion of the interior surface of the annular eductor cap and the open-end of the first motive fluid annulus defines a concentric eductor space comprising a concentric first annular eductor space and second annular eductor space, the first annular eductor space defined at least in part by a portion of the interior surface of the annular eductor cap and a portion of the concentric outward-facing exterior surface of the first motive fluid annulus, and the second annular eductor space defined at least in part by the interior surface of the annular eductor cap and a portion of the inward-facing exterior surface of the first motive fluid annulus.

16. The heat transfer system of claim 15, wherein the fluid eductor comprises the first Coanda surface and the second Coanda surface.

17. A fluid eductor comprising:
- a first motive fluid annulus extending circumferentially about an axis and having an open-end and a closed-end, an interior surface of the first motive fluid annulus defining a first motive fluid delivery chamber, and an exterior surface of the first motive fluid annulus comprising a concentric outward-facing exterior surface and inward-facing exterior surface; and
- an annular eductor cap connected to the first motive fluid annulus, the annular eductor cap extending circumferentially about the axis and defining a semicircular annulus, wherein at least a portion of an interior surface of the annular eductor cap concentrically envelops the open-end of the first motive fluid annulus; and
- wherein at least a portion of the interior surface of the annular eductor cap and the open-end of the first motive fluid annulus defines a concentric eductor space comprising a concentric first annular eductor space and second annular eductor space, the first annular eductor space defined at least in part by a portion of the interior surface of the annular eductor cap and a portion of the concentric outward-facing exterior surface of the first motive fluid annulus, and the second annular eductor space defined at least in part by the interior surface of the annular eductor cap and a portion of the inward-facing exterior surface of the first motive fluid annulus,
- wherein the fluid eductor is positioned downstream from a heat exchanger, and wherein the fluid eductor is used to draw a suction fluid through the heat exchanger to cool a stream of hot fluid.

18. The fluid eductor of claim 17, further comprising:
- at least one motive fluid supply inlet positioned about the exterior surface of the first motive fluid annulus.

19. The fluid eductor of claim 17, further comprising:
- a first Coanda surface defining a transition from the interior surface of the first motive fluid annulus to the concentric outward-facing exterior surface of the first motive fluid annulus, and
- a second Coanda surface defining a transition from the interior surface of the first motive fluid annulus to the inward-facing exterior surface of the first motive fluid annulus.

20. The fluid eductor of claim 19, wherein the first Coanda surface defines at least a portion of the first annular eductor space, and wherein the second Coanda surface defines at least a portion of the second annular eductor space.

21. The fluid eductor of claim 17, wherein the concentric outward-facing exterior surface of the first motive fluid annulus defines a first motive flow Coanda surface and a first motive flow guiding surface, and wherein the inward-facing exterior surface of the first motive fluid annulus defines a second motive flow Coanda surface and a second motive flow guiding surface.

22. The fluid eductor of claim 17, further comprising:
- a second motive fluid annulus extending circumferentially about the axis and being concentric to the first motive fluid annulus, the second motive fluid annulus having an open-end and a closed-end, an interior surface of the second motive fluid annulus defining a second motive fluid delivery chamber, and an exterior surface of the second motive fluid annulus comprising a concentric outward-facing exterior surface and inward-facing exterior surface;
- at least one motive fluid distribution spoke operably coupling the first motive fluid delivery chamber to the second motive fluid delivery chamber; and
- a third annular eductor space defined at least in part by the interior surface of the open-end of the second motive fluid annulus, the third annular eductor space being concentric to the first annular eductor space and/or the second annular eductor space.

23. The fluid eductor of claim 22, wherein the open-end of the second motive fluid annulus extends along the axis beyond the closed-end of the first motive fluid annulus.

24. The fluid eductor of claim 22, wherein the concentric outward-facing exterior surface of the second motive fluid annulus defines a first secondary flow Coanda surface, and wherein the inward-facing exterior surface of the second motive fluid annulus defines a second secondary flow Coanda surface.

25. The fluid eductor of claim 17, wherein the fluid eductor is configured to eject a motive fluid out of the concentric eductor space, the motive fluid comprising ambient air or an inert gas.

26. The fluid eductor of claim 25, further comprising at least one motive fluid supply line operably coupled to the first motive fluid delivery chamber to supply the motive fluid to the first motive fluid delivery chamber.

27. The fluid eductor of claim 17, wherein the fluid eductor is disposed within a tube defining a suction fluid pathway.

28. The fluid eductor of claim 27, wherein the tube is positioned downstream from the heat exchanger, and wherein the fluid eductor is used to draw the suction fluid through the heat exchanger to cool a stream of hot fluid.

29. The fluid eductor of claim 28, wherein the stream of hot fluid comprises oil from a turbomachine engine.

30. The fluid eductor of claim 28, wherein the heat exchanger comprises an air-cooled-oil-cooler, the hot fluid comprising oil and the suction fluid comprising ambient air or an inert gas.

31. A heat transfer system, the heat transfer system comprising:
a tube defining a suction fluid pathway and a heat exchanger defining a cooling fluid pathway and a portion of the suction fluid pathway, the heat exchanger arranged to exchange heat between a cooling fluid in the cooling fluid pathway and a suction fluid in the suction fluid pathway;
a fluid eductor disposed within the suction fluid pathway downstream from the heat exchanger; and
a motive fluid supply line operably coupled to the fluid eductor;
wherein the fluid eductor comprises:
a first motive fluid annulus extending circumferentially about an axis and having an open-end and a closed-end, an interior surface of the first motive fluid annulus defining a first motive fluid delivery chamber, and an exterior surface of the first motive fluid annulus comprising a concentric outward-facing exterior surface and inward-facing exterior surface; and
an annular eductor cap connected to the first motive fluid annulus, the annular eductor cap extending circumferentially about the axis and defining a semicircular annulus, wherein at least a portion of an interior surface of the annular eductor cap concentrically envelops the open-end of the first motive fluid annulus; and
wherein at least a portion of the interior surface of the annular eductor cap and the open-end of the first motive fluid annulus defines a concentric eductor space comprising a concentric first annular eductor space and second annular eductor space, the first annular eductor space defined at least in part by a portion of the interior surface of the annular eductor cap and a portion of the concentric outward-facing exterior surface of the first motive fluid annulus, and the second annular eductor space defined at least in part by the interior surface of the annular eductor cap and a portion of the inward-facing exterior surface of the first motive fluid annulus,
wherein the fluid eductor is positioned downstream from a heat exchanger, and wherein the fluid eductor is used to draw a suction fluid through the heat exchanger to cool a stream of hot fluid.

32. A fluid eductor comprising:
a first motive fluid annulus extending circumferentially about an axis and having an open-end and a closed-end, an interior surface of the first motive fluid annulus defining a first motive fluid delivery chamber, and an exterior surface of the first motive fluid annulus comprising a concentric outward-facing exterior surface and inward-facing exterior surface;
a second motive fluid annulus extending circumferentially about the axis and being concentric to the first motive fluid annulus, the second motive fluid annulus having an open-end and a closed-end, an interior surface of the second motive fluid annulus defining a second motive fluid delivery chamber, and an exterior surface of the second motive fluid annulus comprising a concentric outward-facing exterior surface and inward-facing exterior surface; and
an annular eductor cap connected to the first motive fluid annulus, the annular eductor cap extending circumferentially about the axis and defining a semicircular annulus, wherein at least a portion of an interior surface of the annular eductor cap concentrically envelops the open-end of the first motive fluid annulus, wherein at least a portion of the interior surface of the annular eductor cap and the open-end of the first motive fluid annulus defines a concentric eductor space comprising a concentric first annular eductor space and second annular eductor space, the first annular eductor space defined at least in part by a portion of the interior surface of the annular eductor cap and a portion of the concentric outward-facing exterior surface of the first motive fluid annulus, and the second annular eductor space defined at least in part by the interior surface of the annular eductor cap and a portion of the inward-facing exterior surface of the first motive fluid annulus; and
at least one motive fluid distribution spoke operably coupling the first motive fluid delivery chamber to the second motive fluid delivery chamber, and
a third annular eductor space defined at least in part by the interior surface of the open-end of the second motive fluid annulus, the third annular eductor space being concentric to the first annular eductor space and/or the second annular eductor space.

\* \* \* \* \*